(12) United States Patent
Hatagishi et al.

(10) Patent No.: US 6,595,668 B2
(45) Date of Patent: Jul. 22, 2003

(54) LAMP UNIT ASSEMBLING METHOD AND LAMP UNIT MOUNTING STRUCTURE

(75) Inventors: Yuji Hatagishi, Shizuoka (JP); Toshiaki Okabe, Shizuoka (JP); Kentaro Nagai, Shizuoka (JP); Kenji Oishi, Shizuoka (JP); Kazuyuki Shiraki, Aichi (JP); Isao Yoneyama, Aichi (JP); Goro Takahashi, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/964,609

(22) Filed: Sep. 28, 2001

(65) Prior Publication Data

US 2002/0041496 A1 Apr. 11, 2002

(30) Foreign Application Priority Data

Sep. 28, 2000 (JP) ........................................ 2000-296724

(51) Int. Cl.⁷ ................................................. B60Q 1/26
(52) U.S. Cl. ........................ 362/490; 362/479; 362/488; 362/549
(58) Field of Search ................................ 362/478, 479, 362/485, 487, 488, 490, 496, 546, 548, 549, 394

(56) References Cited

U.S. PATENT DOCUMENTS

| | | | | | |
|---|---|---|---|---|---|
| 5,345,372 A | * | 9/1994 | Takano et al. | ............ | 200/16 C |
| 5,957,575 A | * | 9/1999 | Decker et al. | ............... | 362/147 |
| 6,013,956 A | * | 1/2000 | Anderson, Jr. | ............. | 307/10.1 |
| 6,325,526 B1 | * | 12/2001 | Yabata et al. | ............... | 200/549 |
| 6,402,354 B1 | * | 6/2002 | Tatewaki et al. | ............ | 362/234 |
| 2001/0022730 A1 | * | 9/2001 | Nagata et al. | .............. | 362/490 |

FOREIGN PATENT DOCUMENTS

| | | | |
|---|---|---|---|
| DE | 39 28 030 A1 | 4/1990 | |
| DE | 38 37 171 A1 | 5/1990 | |
| DE | 195 06 365 A1 | 9/1995 | |
| DE | 196 24 013 C1 | 11/1997 | |
| DE | 44 47 527 C1 | 1/1998 | |
| EP | 0 3740149 A2 | 12/1989 | |
| JP | 4-57454 | 5/1992 | ............ B60Q/3/02 |
| JP | 5-131882 | 5/1993 | ........... B60R/16/02 |
| JP | 08-169278 A | 7/1996 | |

* cited by examiner

Primary Examiner—Sandra O'Shea
Assistant Examiner—John Amarantides
(74) Attorney, Agent, or Firm—Sughrue Mion, PLLC

(57) ABSTRACT

A connection portion (13) of an FFC (12) to be preliminarily arranged on a roof trim (10) is weld-fixed to cable connecting portions (25a, 26a) of a bus bar (25) and a spring terminal (26) of a room lamp (20). Simultaneously with the arrangement of the FFC (12) on a vehicle-body-panel-side portion of the roof trim, the room lamp (20) is mounted in the lamp mounting window.

14 Claims, 23 Drawing Sheets

LAMP UNIT ASSEMBLING METHOD AND LAMP UNIT MOUNTING STRUCTURE

BACKGROUND OF THE INVENTION

The present invention relates to a lamp unit assembling method and a lamp unit mounting structure for mounting a lamp unit, such as a room lamp, in a lamp mounting window of an interior wall member, such as a roof trim, which covers a vehicle body panel.

Generally, when lamp units, such as a room lamp and a courtesy lamp, are mounted on interior wall members, such as a roof trim and a door trim, each of the lamp units is mounted in a corresponding one of lamp mounting windows opened in the interior wall members.

FIGS. 23 and 24 are a perspective view and a sectional view illustrating a related automobile roof assembling method disclosed in Japanese Unexamined Utility Model Publication Hei. 4-57454 and a related lamp unit assembling structure disclosed in Japanese Unexamined Patent Publication Hei. 5-131882, respectively. As shown in FIG. 23, a roof harness 37 is first mounted under a body roof 2 serving as a body panel of a vehicle body 1. Subsequently, a roof trim 30 serving as an interior wall member for covering the body roof 2 is mounted thereunder.

Further, connectors 40 and 41 of the room harness 37 are temporarily and downwardly drawn together with cables 37a and 37b out of a room lamp mounting window 31a and a map lamp mounting window 31b, which serve as the lamp mounting windows opened in the roof trim 30, and then connected to the lamp units, such as the room lamp 35 and the map lamp 36, respectively. Subsequently, the cables 37a and 37b are placed on the roof trim 30 through a room lamp mounting window 31a and a map lamp mounting window 31b. Then, the room lamp 35 and the map lamp 36 are respectively mounted in the room lamp mounting window 31a and the map lamp mounting window 31b by screwing. Finally, non-electric components, such as a rearview mirror 38 and a sun visor 39, are mounted on the roof trim 30. Thus, an automobile roof is assembled.

For example, the room lamp 35 serving as the lamp unit mainly comprises a housing 34, a bulb (that is, an electric bulb) 44, and a cover lens 33, as shown in FIG. 24. The bulb 44 is inserted into between bus bars 43, 43 serving as bulb contacts fixed to the housing 34. One of the bus bars 43, 43 is connected to a room-lamp-side connector 45. A tapping screw 42 for fixing the room lamp 35 to the roof trim 30 is mounted to the housing 34. A mounting hole 32, into which the tapping screw 42 is inserted, is provided in the roof trim 30.

Moreover, a switch unit (not shown), which accommodates a switch circuit connected to the bus bar 43 and is enabled to switch between ON and OFF states of the bulb 44, is attached to the room lamp 35. Furthermore, according to the specification of a vehicle, a reflector designed in consideration of the luminous intensity distribution of the bulb 44 may be attached to a vehicle body panel side portion of the housing 34 in addition to the aforementioned constituent elements.

FIG. 25 is a schematic view illustrating a mounting structure for related lamp units disclosed in Japanese Unexamined Patent Publication Hei. 1-307108. FIG. 26 is a sectional view illustrating a primary part of this structure. As illustrated in FIGS. 25 and 26, a room lamp 57 and a spotlight 58 are lamp units respectively mounted in lamp mounting windows 55 and 56 opened in a roof trim 53 serving as an interior wall member that covers a body roof 52.

As shown in FIG. 25, a flat cable harness 51 fixed too circuit elements to an insulating sheet is wired between the room lamp 57 and the spotlight, so that the room lamp 57 and the spotlight 58 are integrally formed to constitute a roof harness 50.

Thus, since the components to be roof-mounted, such as the room lamp 57, the spotlight 58, the rearview mirror (not shown), and a sun visor, on the roof trim 53 is preliminarily assembled to form a roof module and then the module is mounted on the body roof 52, an operation of mounting components on the roof trim 53 can be omitted when a low-workability roof trim is mounted, thereby facilitating an assembling operation.

Meanwhile, according to the related automobile roof assembling method illustrated in FIGS. 23 and 24, for example, when the aforementioned related room lamp 35 is mounted onto the roof trim 30, it is necessary to temporarily and downwardly draw the connector 40 connected to the cable 37a of the roof harness 37 from the room lamp mounting window 31a and to then connect the connector 4 to a room-lamp-side connector 45 of the room lamp 35. Further, upon completion of connecting the connector 4 thereto, it is necessary to place the connectors 40 and 45 on the roof trim 30 together with the cable 37a of the roof harness 37 through the lamp mounting window 31a and to then fix the room lamp 35 to the lamp mounting window 31a by using the tapping screw 42. This complicates the assembling operation that is overhead work performed in a narrow working space. Consequently, good workability is difficult to obtain.

Thus, the module is preliminarily formed by mounting the components to be roof-mounted, such as the room lamp 35, the map lamp 36, the rearview mirror 38, and the sun visor 39, onto the roof trim 30. Then, the module is mounted on the body roof 2. Consequently, the operation of mounting the components on the roof trim can be omitted. This facilitates the assembling operation.

However, when the module is mounted thereon, the body roof trim 30 covers and hermetically seals the bottom-side portion of the body roof 2, so that an enclosed chamber is formed therein. Therefore, the connectors 40 and 41 placed in the enclosed chamber cannot be connected to the room lamp 35 and the map lamp 36. Thus, the following method is considered. The connectors 40 and 41 at the side of the body roof 2 are fixed, as employing reception connectors, at places respectively portions corresponding to the room lamp 35 and the map lamp 36 at the side of the module, simultaneously with the mounting of the module thereon. However, the mounting accuracy of the module (or the roof trim 30) is significantly low, as compared with the connecting accuracy of the connectors 40 and 41. Actually, it is difficult to connect the connectors 40 and 41 to the connector portions with good accuracy. Especially because of the fact that the connection states of the connectors 40 and 41 cannot be visually checked by a worker, this conventional method has encountered a problem of poor connection reliability.

Further, the room lamp 35 has a lamp function portion, that is, comprises a portion that the housing 34, the tapping screw 42, the bus bar 43, the bulb 44, the connectors 40, 45 and the switch unit, as described above. Thus, the number of components of the functional portion of the room lamp 35 is large. When the reflector is attached thereto, the number of components thereof increases still more.

Further, as the manufacturing costs of the components increase, the assembling thereof is complicated more and more. Consequently, it is difficult to reduce the manufacturing cost of the lamp unit.

On the other hand, in the case of the related lamp unit mounting structure illustrated in FIGS. 25 and 26, when a roof module obtained by preliminarily inserting the room lamp 57 and the spotlight 58 into the lamp mounting windows 55 and 56 of the roof trim 53 is mounted onto the body roof 52, the roof trim 53 is assembled and fixed to the body roof 52, as shown in FIG. 26. Simultaneously, the room lamp 57 is screwed into and fixed to the body roof 52. Moreover, the room lamp 57 is fitted into the opening formed in the body roof 52. Thus, the lamp unit is mounted onto the roof trim.

Thus, in the case that the roof trim 3, whose mounting accuracy is poor, causes positional displacement with respect to the body roof 52 when the roof trim (or roof module) 53 is assembled to the body roof 52 in a vehicle body assembly line, the room lamp 57 inserted into the lamp mounting window 55 of the roof trim 53 causes positional displacement with respect to the screw holes and the openings provided in the body roof 52. Thus, there is a possibility that the room lamp 57 cannot be mounted onto the body roof 52.

Further, even when the room lamp 57 is mounted thereon, a gap S is provided between the peripheral edge of the cover lens of the room lamp 57 and the periphery of the lamp mounting window 55 so that the width of the gap S is equal to an amount of positional displacement of a center mounting axis $O_1$ of the room lap 57 mounted on the body roof 52 with respect to a center axis $O_2$ of the opening, that is, the lamp mounting window 55, as illustrated in FIG. 26. This deteriorates the appearance of the lamp unit. Thus, this related mounting structure has encountered another problem of degradation in quality of the lamp unit.

That is, the related mounting structure for the lamp unit illustrated in FIG. 25 has encountered problems that the assembling workability at the assembling of the roof trim 53 and the body roof 52 is not good, and that an assembling failure is liable to occur.

SUMMARY OF THE INVENTION

Accordingly, an object of the invention is to solve the aforementioned problems and to provide a lamp unit assembling method and a lamp unit mounting structure, which facilitate an operation of assembling a lamp unit and enable reliable connection of cables and construction of a high-quality lamp unit.

To achieve the foregoing object, according to a first aspect of the invention, there is provided a lamp unit assembling method (hereunder referred to as a first assembling method), which comprises the steps of fixing connection portions of cables to cable connecting portions of a lamp unit, and subsequently mounting the lamp unit in a lamp mounting window provided in an interior wall member and arranging the cable on a vehicle body panel side portion of the interior wall member to thereby construct a module, and assembling the module in such a way as to cover a vehicle body panel.

According to a second aspect of the invention, there is provided a lamp unit mounting structure (hereunder referred to as a first mounting structure) for mounting a lamp unit in a lamp mounting window provided in an interior wall member covering a vehicle body panel. The lamp unit consists of a design portion and a functional portion. A connection portion of a cable to be arranged on a vehicle body panel side portion of the interior wall member is fixed to a cable connecting part of the functional portion.

According to a third aspect of the invention, there is provided a lamp unit mounting structure (hereunder referred to as a second mounting structure) for mounting a lamp unit in a lamp mounting window provided in an interior wall member covering a vehicle body panel. The lamp unit consists of a design portion and a functional portion. The functional portion comprises a reflector, which is integrally formed from an electrically conductive material and provided with one of bulb contacts, and a switch unit that accommodates a switch circuit and has the other of the bulb contacts. A connection portion of each of cables to be arranged on a vehicle body panel side portion of the interior wall member is fixed to a cable connecting portion of a corresponding one of the reflector and the switch unit.

According to a fourth aspect of the invention, there is provided a lamp unit mounting structure (hereunder referred to as a third mounting structure) for mounting a lamp unit in a lamp mounting window provided in an interior wall member covering a vehicle body panel. The lamp unit comprises a functional portion, which has a switch unit, and a design portion latching a switch knob slidably. The functional portion is mounted on the vehicle body panel in such a way as to be able to perform relative displacement only along a direction, in which the switch knob slides, and also mounted in the lamp mounting window of the interior wall member in such a manner as to be able to perform relative displacement at least along a direction perpendicular to the direction in which the switch knob slides. The design portion is fixed from an indoor side in the lamp mounting window provided in the interior wall member. A switch lever of the switch unit engages with an engaging portion of the switch knob in such a way as to be able to perform relative displacement only in a direction perpendicular to the direction, in which the switch knob slides, and is operated by the switch knob.

According to a fifth aspect of the invention, there is provided a lamp unit mounting structure (hereunder referred to as a fourth mounting structure) for mounting a lamp unit in a lamp mounting window provided in an interior wall member covering a vehicle body panel. The lamp unit comprises a functional portion thereof, which has a switch unit, and a design portion latching a switch knob slidably. The functional portion is elastically supported in the lamp mounting window of the interior wall member in such a manner as to be able to perform relative displacement at least along a direction in which the switch knob slides. The design portion having a position regulating member for restricting relative displacement of the switch knob along the direction, in which the switch knob slides.

According to the first assembling method, and the first and second mounting structures, each of the connection portions of the cable to be preliminarily arranged on the interior wall member is fixed to a corresponding one of the cable connecting portions of the lamp unit (that is, the functional portion). When the cable is arranged on the interior wall member, the lamp unit (that is, the functional portion) is simultaneously mounted in the lamp mounting window.

Thus, the lamp unit (that is, the functional portion) and the cable are put into a state, in which the lamp unit (the functional portion) and the cable are electrically connected to each other, without using the connectors. Further, the lamp unit (that is, the functional portion) and the cable, which are in such a state, and the interior wall member are integrally formed and modularized. Then, an assembling operation is completed only by assembling a module, which is formed so that the lamp unit (that is, the functional portion) and the cable are integral with the interior wall member, to the vehicle body panel.

Further, the electrical connection between the lamp unit (that is, the functional portion) and the cable is established by a worker who visually checks the connection state thereof and fixes the cable to the lamp unit (that is, the functional portion) by working in a downward posture. Thus, high reliability of the connection therebetween is obtained, regardless of the accuracy of mounting of the interior wall member onto the vehicle body panel.

Incidentally, preferably, in an embodiment of the first assembling method, the first mounting structure, or the second mounting structure, a cable fixing member for fixing the cable to the functional portion thereby to prevent a pulling force from acting upon the connection portion of the cable is provided in the vicinity of the connection portion.

In this case, a part, which is close to the connection portion, of the cable is fixed by the cable fixing member (that is, the functional portion). Thus, the fixed part is reliably prevented from being disconnected from the lamp unit by a pulling force that is generated due to oscillations caused when the cable is arranged on the interior wall member or when the vehicle runs, and that acts upon the connection portion of the cable.

Further, according to the first mounting structure, even when the functional portion fixed to the connection portion of the cable is transported together with the cable and mounted on the interior wall member, the design portion is prevented from being flawed by being brought into contact with other members.

Moreover, even in the case that the design portions of the lamp units differ from each other according to the types of vehicles, the functional portion may be employed in common by the lamp units. Thus, it is sufficient to change only the design portion so as to manufacture the lamp units.

Incidentally, preferably, in the case of an embodiment of the first mounting structure, when a switch lever of the functional portion is latched by the design portion, and the design portion is assembled to the functional portion, the switch lever is operated by a switch knob engaging with the switch lever.

In this case, even when the switch knob of the lamp unit change according to the typed of the interior, the functional portion may be employed in common by the lamp units. Thus, it is sufficient to change only the switch knob according to the predetermined color and shape. Furthermore, the engagement between the switch knob and the switch lever can be performed simultaneously with the assembling of the design portion to the functional portion, so that the number of man-hours needed to perform the assembling operation does not increase.

Further, according to the third mounting structure, a bulb (that is, an electric bulb) is mounted between one of the bulbs, which is provided in the reflector that is integrally formed from the electrically conductive material and that serves as a circuit conductor, and the other bulb contact of the switch unit. Moreover, the connection portion of each of the cables is directly fixed to the cable connecting portion of a corresponding one of the reflector and the switch unit of the functional portion. This eliminates the necessity for providing conductors, such as a bus bar, and connector portions in the functional portion in such a way as to be separated from one another. Consequently, the number of components is reduced, as compared with that of components of the conventional lamp unit.

Incidentally, preferably, in an embodiment of the second mounting structure, the cable connecting portion of the reflector is provided in the vicinity of the cable connecting portion of the switch unit so that the cable connecting portions of the reflector and the switch unit are placed in juxtaposition with each other. Thus, the cable connecting portions, to which the connection portions of the cables are fixed, are put together at one place.

Operations of fixing the cables are collectively performed at this place. This enhances workability and increases flexibility in designing wiring paths.

Further, preferably, in an embodiment of the second mounting structure, the reflector has a latching member enabled to be caught in the lamp mounting window. Thus, when the module is formed by preliminarily assembling the functional portion to the interior wall member, the assembling operation is facilitated still more.

Moreover, preferably, in an embodiment of the second mounting structure, the reflector has a cable holding portion for guiding and holding the cable arranged along an outer side surface of the reflector. Thus, when the functional portion is mounted in the lamp mounting window of the interior wall member, the biting of the cable is prevented.

According to the third mounting structure, the functional portion to be connected to each of the cables preliminarily arranged on the interior wall member is mounted in such a manner as to be able to perform relative displacement at least along a direction perpendicular to the direction in which the switch knob slides. Moreover, the design portion is fixed from an indoor side in such a manner as to cover the lamp mounting window.

At that time, the switch lever of the switch unit engages with the engaging portion of the switch knob slidably caught in the design portion, and is enabled to be operated by the switch knob.

Further, the lamp unit consisting of the functional portion and the design portion is formed in such a way as to be integral with the interior wall member and to be modularized before assembled to the vehicle body panel.

Subsequently, when the interior wall member formed in such a way as to be integral with the lamp unit is assembled to the vehicle body panel, the functional portion is simultaneously mounted on the vehicle body panel in such a way as to be able to perform relative displacement along the direction in which the switch knob slides.

Thus, when the interior wall member assembled to the vehicle body panel causes positional displacement with respect to the vehicle body panel along the sliding direction in which the switch knob slides, the functional portion can perform relative displacement with respect thereto along the sliding direction together with the interior wall member. Consequently, the functional portion is mounted on the vehicle body panel by absorbing the positional displacement caused along this sliding direction.

On the other hand, when the interior wall member assembled to the vehicle body panel causes positional displacement with respect to the vehicle body panel along a direction perpendicular to the sliding direction in which the switch knob slides, the functional portion can perform relative displacement with respect thereto along the sliding direction together with the interior wall member. Consequently, the functional portion is mounted on the vehicle body panel by absorbing the positional displacement caused along the direction perpendicular to the sliding direction.

Therefore, an assembling failure disabling the mounting of the lamp unit is prevented from occurring owing to the positional displacement caused at the time of assembling the interior wall member to the vehicle body panel. Consequently, the functional portion is easily assembled to the vehicle body panel by simultaneously performing aligning.

Furthermore, the design portion is fixed in the lamp mounting window of the interior wall member from the indoor side independent of the functional portion. Thus, the design portion is mounted at the predetermined place regardless of the positional displacement of the interior wall member with respect to the vehicle body panel. Consequently, the appearance of the lamp unit is not deteriorated by the mounting state of the interior wall member, so that the quality of the lamp unit is enhanced.

Further, as described above, when the functional portion absorbs the positional displacement caused in the direction perpendicular to the sliding direction in which the switch knob slides, the functional portion performs positional displacement with respect to the interior wall member. However, the switch lever engages with the engaging portion of the switch knob in such a way as to be able to perform positional displacement in the direction perpendicular to the sliding direction in which the switch knob slides. Thus, the engagement between the switch lever and the switch knob is established without hindrance.

Conversely, when the functional portion absorbs the positional displacement caused along the sliding direction in which the switch knob slides, the functional portion performs relative displacement together with the switch knob fixed to the interior wall member. Thus, the switch lever does not need to engage with the engaging portion of the switch knob. Consequently, the switch lever is enabled to minimize the gap in the sliding direction between the switch lever and the engaging portion of the switch knob. The operating range of each of the switch lever and the switch knob does not change according to the mounting state of the interior wall member to the vehicle body panel.

According to the fourth mounting structure of the invention, the functional portion, which is connected to each of the cables preliminarily arranged on the interior wall member, is elastically supported in such a way as to perform positional displacement at least along the sliding direction, in which the switch knob slides, with respect to the lamp mounting window of the interior wall member. Thus, the functional portion is mounted without backlash by simultaneously aligning. Consequently, the assembling of the functional portion is facilitated.

Further, when the design portion is fixed from the indoor side in such a way as to cover the lamp mounting window, the position regulating member of the design portion engages with the functional portion and regulates the relative displacement caused along the sliding direction in which the switch knob slides. When the switch lever of the switch unit of the functional portion is engaged with the engaging portion of the switch knob that is slidably caught by the design portion, the switch lever is enabled by the switch knob to operate.

Thus, the movement of the functional portion, which is caused in response to an operation of the switch knob, is restricted. Therefore, although the functional portion is elastically supported against the lamp mounting window, so that the assembling of the lamp unit is easily performed, the operability of each of the switch knob and the switch lever is enhanced. Further, the quality of the lamp unit is improved.

Incidentally, preferably, in an embodiment of the third mounting structure or the fourth mounting structure, the design portion has a temporally latching member for temporarily latching the switch knob at a predetermined place in such a way as to disable the switch knob from sliding.

In this case, in a state in which the switch knob is temporarily fixed at the predetermined place in such a way as to disable the switch knob sliding, the design portion is fixed from the indoor side in such a manner as to cover the lamp mounting window. Thus, the switch lever of the functional portion is reliably engaged with the engaging portion of the switch knob, which is slidably engaged with the design portion. Therefore, a worker does not need to perform aligning so as to simultaneously fix the design potion to the interior wall member.

This facilitates the assembling of the lamp unit and the reliable engagement of the switch lever with the engaging portion of the switch knob. Consequently, an occurrence of an assembling failure is prevented. Moreover, the quality of the lamp unit is improved.

Furthermore, preferably, according to an embodiment of the third mounting structure or the fourth mounting structure, the engaging portion of the switch knob has a latching member for enabling the switch lever to be inserted along the sliding direction in which the switch knob slides.

In this case, the latching member of the engaging portion of the switch knob enables the switch lever to be inserted along the sliding direction only by performing a sliding operation on the switch knob, which is latched by the design portion, after the design portion is fixed to the interior wall member in such a manner as to cover the lamp mounting window. Thus, the switch lever is reliably engaged with the engaging portion of the switch knob.

Consequently, a worker does not need to perform aligning so as to simultaneously fix the design potion to the interior wall member. This facilitates the assembling of the lamp unit and the reliable engagement of the switch lever with the engaging portion of the switch knob. Thus, an occurrence of an assembling failure is prevented. Moreover, the quality of the lamp unit is improved.

DETAILED DESCRIPTION OF PREFERRED EMBODIMENTS

Hereinafter, a lamp unit assembling method and a lamp unit mounting structure, each of which is according to an embodiment of the invention, are described in detail with reference to the accompanying drawings.

First Embodiment

Figure 1:
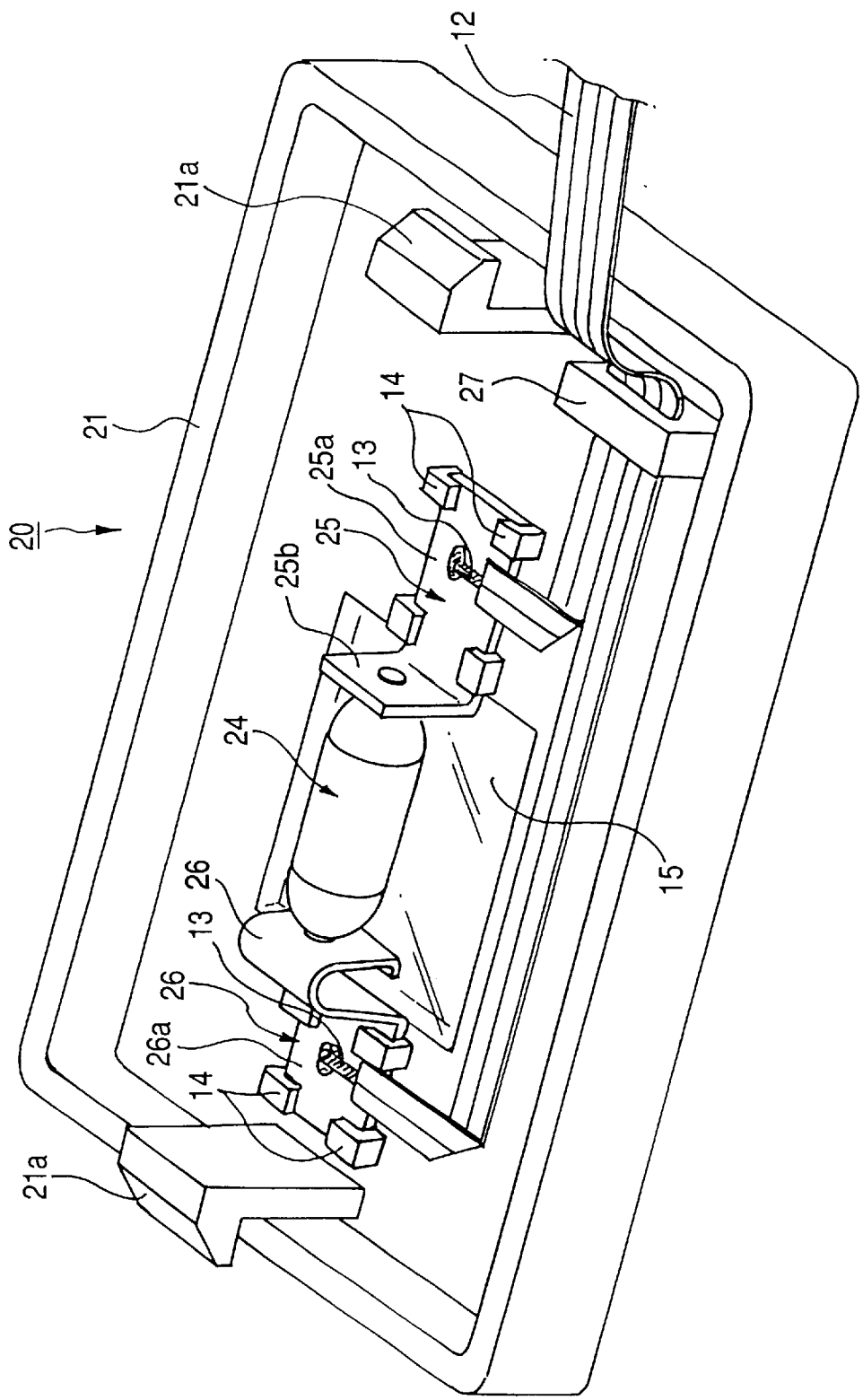
FIG. 1 is a perspective view illustrating a room lamp to which a lamp unit assembling method according to a first embodiment of the invention is applied.
Figure 2A:
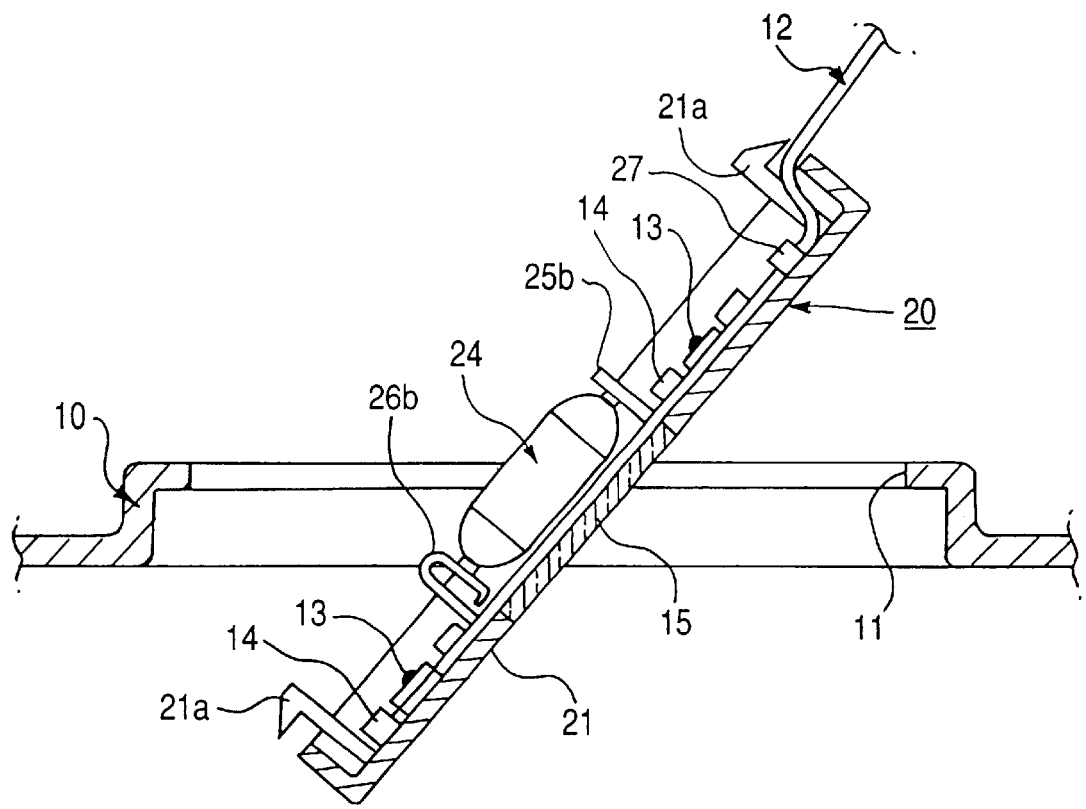
FIGS. 2A and 2B are longitudinal sectional views each illustrating a process of mounting the room lamp shown in FIG. 1 onto a roof trim.
Figure 2B:
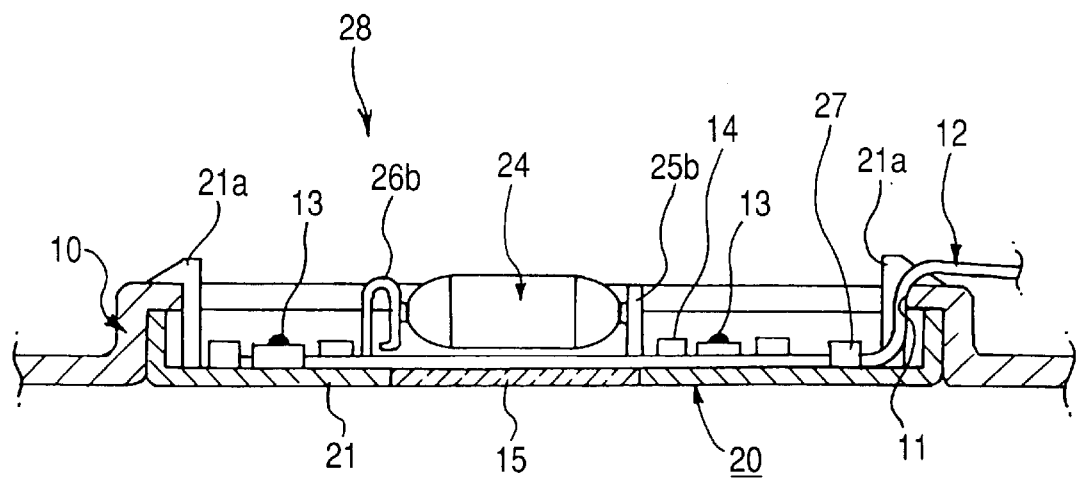

FIG. 1 is a perspective view illustrating a room lamp to which a lamp unit assembling method according to a first embodiment of the invention is applied. FIGS. 2A and 2B are longitudinal sectional views illustrating a process of mounting the room lamp shown in FIG. 1 onto a roof trim.

A room lamp 20 of the first embodiment illustrated in FIG. 1 is a lamp unit to be mounted in a lamp mounting window 11 opened in a roof trim 10 serving as an interior wall member covering a body roof (not shown), which is a vehicle body panel. An FFC (flexible flat cable) 12 serving as a cable constituting a roof harness is connected to a bulb 24 mounted in a unit body 21 through a bus bar 25 and a spring terminal 26 (see FIGS. 2A and 2B).

The unit body 21 has a lens portion 15 corresponding to the bulb 24 placed nearly at the center of a bottom wall portion, and a pair of flexible opposed latching pieces 21a, 21a provided along a pair of opposed side edges, respectively, in such a manner as to project therefrom.

The bus bar 25 constructed by bending an electrically conductive plate member like a letter "L" has a cable connecting portion 25a which is fixed to a latching claw 14 projected from the bottom wall surface of the unit body 21, and a supporting portion 25b adapted to hold and fix an end portion of the bulb 24 and to be electrically connected thereto.

The spring terminal 26 constructed by bending an electrically conductive plate member has a cable connecting portion 26a, which is fixed to a latching claw 14 provided on the bottom wall surface of the unit body 21, and a spring portion 26b, which has a U-shaped section and faces the supporting portion 25b so that the other end portion of the bulb 24 is elastically sandwiched between the supporting portions 25b and 26b and which is electrically connected thereto.

The peeled-off connection portion 13 of the FFC 12 is welded and fixed to each of the cable connecting portions 25a and 26a of the bus bar 25 and the spring terminal 26, and is electrically connected thereto. Apart of the FFC 12 close to the connection portion is fixed to the unit body 21 by the strain relief 27 serving as the cable fixing member, which is provided on the bottom wall surface of the unit body 21, in such a way as to be inserted into and held in the strain relief 27. Even when a pulling force acts upon the other end portion of the FFC 12, the pulling force does not act upon the connection portions 13, 13 fixed to the cable connecting portions 25a and 26a.

That is, the connection portions 13, 13 of the FFC 12, which are roof harnesses preliminarily arranged on the roof trim 10, are welded and fixed to the cable connecting portions 25a and 26a of the bus bar 25 and the spring terminal 26 of the room lamp 20 and electrically connected thereto. At that time, a worker can visually check the connection state thereof and fix the cable to the lamp unit (that is, the functional portion) by working in a downward posture. Incidentally, although the connection portions 13 and 13 are welded and fixed to the cable connecting portions 25a and 26a in this embodiment, other fixing method, such as a pressure welding connecting method, which performs pressure-welding of the cables to solderless terminals together with sheaths, and a soldering member may be employed.

As viewed in FIG. 2A, the unit body 21 of the room lamp 20 connected to the end portion of the FFC 12 is inserted obliquely from above and from the side of the vehicle body panel into and passes through the lamp mounting window 11. Then, as viewed in FIG. 2B, the unit body 21 is returned to a nearly horizontal posture. Moreover, the flexible latching pieces 21a, 21a of the unit body 21 are latched by the opening edge of the lamp mounting window 11, so that the room lamp 20 is mounted in the lamp mounting window 11.

Subsequently, a map lamp (not shown) connected to the other end portion of the FFC 12 is mounted in the lamp mounting window of the roof trim 10. Then, the FFC 12 is arranged on a vehicle body panel side portion of the FFC 12. Moreover, components to be mounted to the roof, such as a rearview mirror and a sun visor, are preliminarily mounted onto the roof trim 10. Thus, the roof-mounted components and the roof trim 10 are formed in such a manner as to be integral with one another, so that a roof module 28 is constructed.

Then, the assembling operation is completed only by assembling the roof module 28 to the body roof 2 (see FIG.

23). At the mounting of the roof trim 10, an operation of mounting the roof-mounted components is omitted. Thus, the assembling operation is simplified.

That is, according to the lamp unit assembling method in the first embodiment, the connection portions 13 of the FFC 12 arranged on the roof trim 10 are preliminarily fixed to the cable connecting portions 25a and 26a of the bus bar 25 and the spring terminal 26. Thus, when the FFC 12 is arranged on the roof trim 10, the room lamp 20 is simultaneously mounted in the lamp mounting window 11.

Thus, the room lamp 20 and the FFC 12 are electrically connected to each other without using connectors, so that the room lamp 20 and the FFC 12 are integral with the roof trim 10 and that these components are modularized. Further, the assembling operation is completed by only assembling the roof module 28, in which the room lamp 20 and the FFC 12 are integral with the roof trim 10, to the body roof 2.

Therefore, when the roof trim is mounted, the operation of mounting the components to be mounted to the roof can be omitted. The assembling operation, which has conventionally been overhead work performed in a narrow working space, is simplified. Thus, good workability is obtained.

Furthermore, the electrical connection between the cable connecting portions 25a, 26a and the connection portions 13, 13 is established by welding and fixing such portions while a worker preliminarily and visually checks the connection state thereof by working in a downward posture. Thus, high connection reliability is obtained, regardless of the accuracy of mounting of the roof trim 10 to the body roof 2.

Further, in the case of this embodiment, a part of the FFC 12 close to the connection portion is fixed to the unit body 21 by the strain relief 27 serving as the cable fixing member, which is provided on the unit body 21, in such a way as to be inserted into and held in the strain relief 27. Even in the case that a pulling force acts upon the other end portion of the FFC 12 owing to oscillations caused when the FFC 12 is arranged on the roof trim 10 and when the vehicle runs, the pulling force does not act upon each of the connection portions 13, 13 fixed to the cable connecting portions 25a and 26a. Thus, the fixed portions are reliably prevented from coming off therefrom.

Second Embodiment

Figure 3:
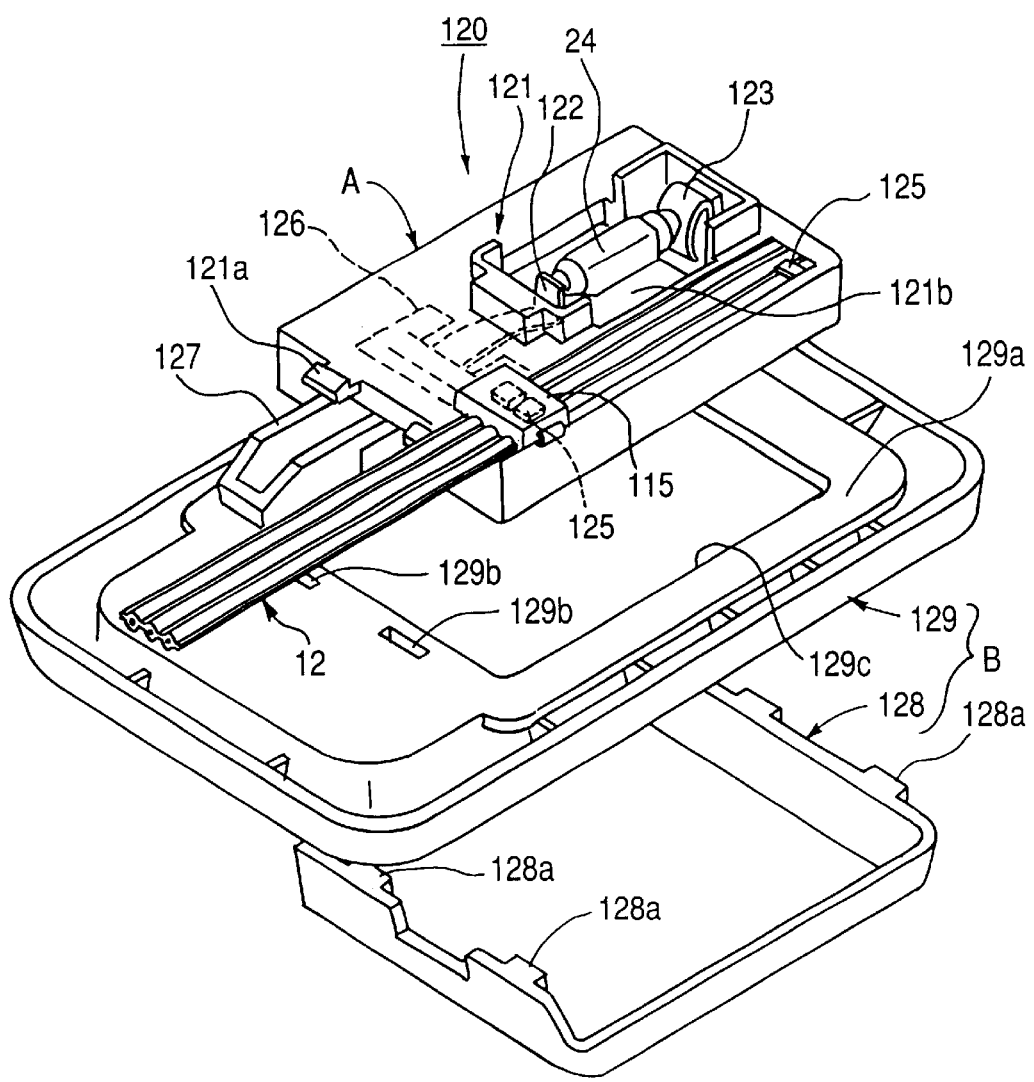
FIG. 3 is an exploded perspective view illustrating a room lamp to which a lamp unit mounting structure according to a second embodiment of the invention is applied.
Figure 4:
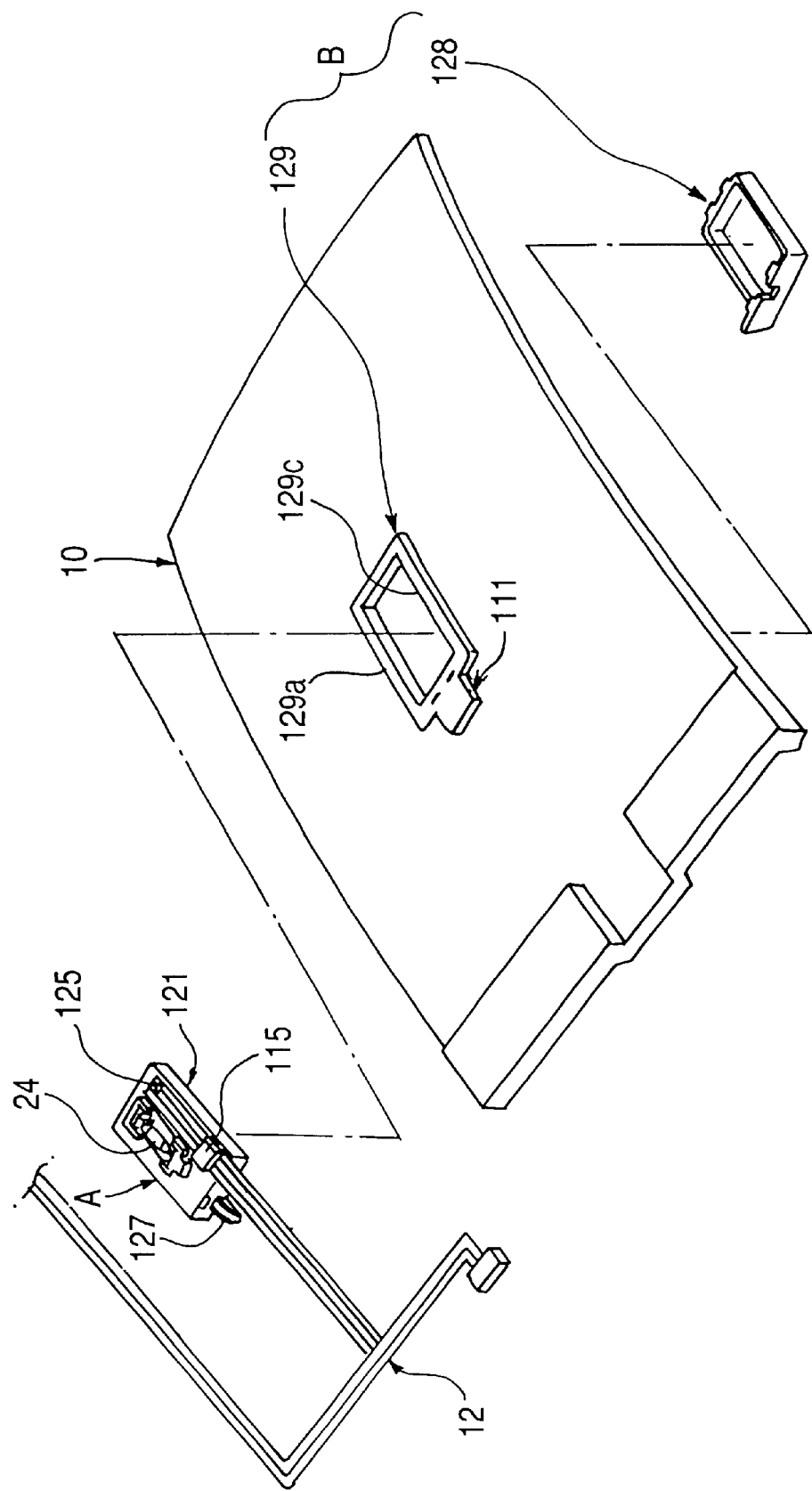
FIG. 4 is a longitudinal sectional view illustrating a process of mounting the room lamp shown in FIG. 3 onto a roof trim.

FIG. 3 is an exploded perspective view illustrating the room lamp to which the lamp unit mounting structure according to the second embodiment of the invention is applied. FIG. 4 is a longitudinal sectional view illustrating a process of mounting the room lamp shown in FIG. 3 onto the roof trim.

The room lamp 120 of the second embodiment illustrated in FIG. 3 is a lamp unit that is mounted in the lamp mounting window 111 opened in the roof trim 10 serving as the interior wall member covering the body roof (not shown), which serves as the vehicle body panel (see FIG. 4).

The room lamp 120 comprises a functional portion A and a design portion B. The functional portion A includes a bulb 24 mounted correspondingly to an opening 121b provided in a housing 121, a tab terminal 122 and a spring terminal 123 which serve as bulb contacts, a switch connecting portion 126, and a switch lever 127. The functional portion A is mounted onto a vehicle body panel side portion of the roof trim 10. The design portion B has a cover lens 128 and a holder 129, and is mounted onto an vehicle interior side portion of the roof trim 10.

The bulb 24 mounted in the housing 121 of the functional portion A is connected to an FFC 12, serving as an electric cable of a roof harness, through the tab terminal 122 of the switch connecting portion 126 and the spring terminal 123.

The switch connecting portion 126 constructed by bending an electrically conductive plate member has a cable connecting portion 125 disposed in the housing 121 and pressure-fixed and electrically connected to the connection portion of the FFC 12, and the tab terminal 122 which holds and fixes one end portion of the bulb 24 and is electrically connected thereto. An on-off operation of the switch connecting portion 126 is performed by using a switch lever 127.

The spring terminal 123 constructed by bending an electrically conductive plate member has a cable connecting portion 125 disposed in the housing 121 and pressure-fixed and electrically connected to the connection portion of the FFC 12, and a spring portion which has a U-shaped section and faces the tab terminal 122 so that the bulb 24 is elastically sandwiched between the supporting portions and the other end of the bulb is electrically connected thereto.

A part of the FFC 12 close to the connection portion is fixed to the housing 121 by the strain relief 115 serving as the cable fixing member, which is provided on the top surface of the housing 121, in such a way as to be inserted into and held in the strain relief 115. Even when a pulling force acts upon the other end portion of the FFC 12, the pulling force does not act upon the connection portions fixed to the cable connecting portions 125 and 125.

That is, the connection portions of the FFC 12 serving as the roof harness preliminarily arranged on the roof trim 10 are pressure-fixed to be electrically connected to the cable connecting portions 125, 125 of the switch connecting portion 126 and the spring terminal 123 of the functional portion A thereby, respectively. At that time, a worker can visually check the connection state thereof by working in a downward posture. Incidentally, although the connection portions of the FFC 12 are pressure-fixed to the cable connecting portions 125, 125 in this embodiment, other kinds of fixing method, such as welding, may be used.

The cover lens 128 of the design portion B is mounted by engaging a latching projection 128a with an engaging portion (not shown) of the holder 129 to be integral with the holder 129. The holder 129 includes a flange portion 129a which holds and fixes an opening edge of the lamp mounting window 111 opened in the roof trim 10, a housing fit-insertion opening 129c into which the housing 121 is fit-inserted, and an engaging hole 129b that is operative to latch-lock the latching piece 121a of the housing 121.

When the room lamp 120 of the second embodiment is mounted onto the roof trim 10, the holder 129 is first mounted in the lamp mounting window 111, as illustrated in FIG. 4. Then, the cover lens 128 is mounted onto the holder 129 from the vehicle interior side (that is, from below, as viewed in FIG. 4) of the roof trim 10. Thus, the design portion B is mounted on the roof trim 10.

Subsequently, the functional portion A of the room lamp 120 connected to the connection portion of the FFC 12 is inserted obliquely from above into the housing fit-insertion opening 129c of the holder 129 by tilting the housing 121 and causing the end portion of the switch lever 127 to slip thereinto and passes through the roof trim 10. Then, the functional portion A is returned to a nearly horizontal posture. Subsequently, the latching piece 121a is latch-locked by the engaging hole 129b, so that the room lamp 120 is mounted in the roof trim 10.

Incidentally, the cover lens 128 may be mounted on the holder 129 after the housing 121 is fit-inserted into the housing fit-insertion opening 129c of the holder 129.

Then, the FFC 12 is arranged on the vehicle body panel side portion (that is, the upper side portion, as viewed in the FIG. 4) of the roof trim 10. Moreover, the roof-mounted components (not shown), such as the rearview mirror and the sun visor, are preliminarily mounted on the roof trim 10. Thus, a roof module, in which the roof-mounted components are formed to be integral with the roof trim 10, is constructed.

Thus, the assembling operation is completed by only mounting the roof module onto the body roof. When the roof trim is mounted, the operation of mounting the roof-mounted components is omitted. This simplifies the assembling operation.

That is, according to the lamp unit mounting structure according to the second embodiment, the connection portions of the FFC 12 preliminarily arranged on the roof trim 10 is fixed to each of the cable connecting portions 125, 125 of the switch connecting portion 126 and the spring terminal 126 of the functional portion A. Simultaneously with the arranging of the FFC 12 on the roof trim 10, the functional portion A of the room lamp 120 is mounted in the lamp mounting window 111.

Thus, the room lamp 120 and the FFC 12 are integral with the roof trim 10 and that these components are modularized while the room lamp 120 and the FFC 12 are electrically connected to each other without using connectors. Further, the assembling operation is completed by only assembling the roof module, in which the room lamp 120 and the FFC 12 are integral with the roof trim 10, to the body roof.

Therefore, when the roof trim is mounted, the operation of mounting the components to be mounted to the roof can be omitted. The assembling operation, which has conventionally been overhead work performed in a narrow working space, is simplified. Thus, good workability is obtained.

Furthermore, the electrical connection between the connection portion of the FFC 12 and each of the cable connecting portions 125, 125 is established by weld-fixing such portions while a worker preliminarily and visually checks the connection state thereof by working in a downward posture. Thus, high connection reliability is obtained, regardless of the accuracy of mounting of the roof trim 10 to the body roof.

Further, in the room lamp 120, the housing 121 of the functional portion A is separated from the cover lens 128 and the holder 129 of the design portion B. Thus, even when the housing 121 fixed to the connection portion of the FFC 12 is transported together with the FFC 12, and when the housing 121 is mounted on the roof trim 10, the cover lens 128 and the holder 129 are neither brought into contact with other members nor damaged.

That is, only the housing 121 of the room lamp 120 is a member that is preliminarily fixed to the connection portion of the FFC 12 and that is easy to come in contact with another member when moved around together with the FFC 12. Moreover, there is no need for moving the cover lens 128 and the holder 129, which are in possibility of being damaged so that the appearance of the lamp unit is deteriorated, together with the FFC 12.

Moreover, even in the case that the cover lens 128 and the holder 129 of the room lamp 120 differ from those of another lamp unit according to the types of vehicles, the housing 121 can be used in common by the lamp units. Thus, it is sufficient to change only the cover lens 128 and the holder 129 so as to manufacture the lamp units. Consequently, the manufacturing cost of the room lamps 120 is reduced.

Furthermore, in the case of the second embodiment, a part of the FFC 12 close to the connection portion is fixed by the strain relief 115, which is provided on the housing 121, in such a way as to be inserted into and held in the housing 121. Even in the case that a pulling force acts upon the other end portion of the FFC 12 owing to oscillations caused when the FFC 12 is arranged on the roof trim 10 and when the vehicle runs, the pulling force does not act upon the connection portions of the FFC 12, which are fixed to the cable connecting portions 125 and 125. Thus, the fixed portions are reliably prevented from coming off therefrom.

Third Embodiment

Figure 5:
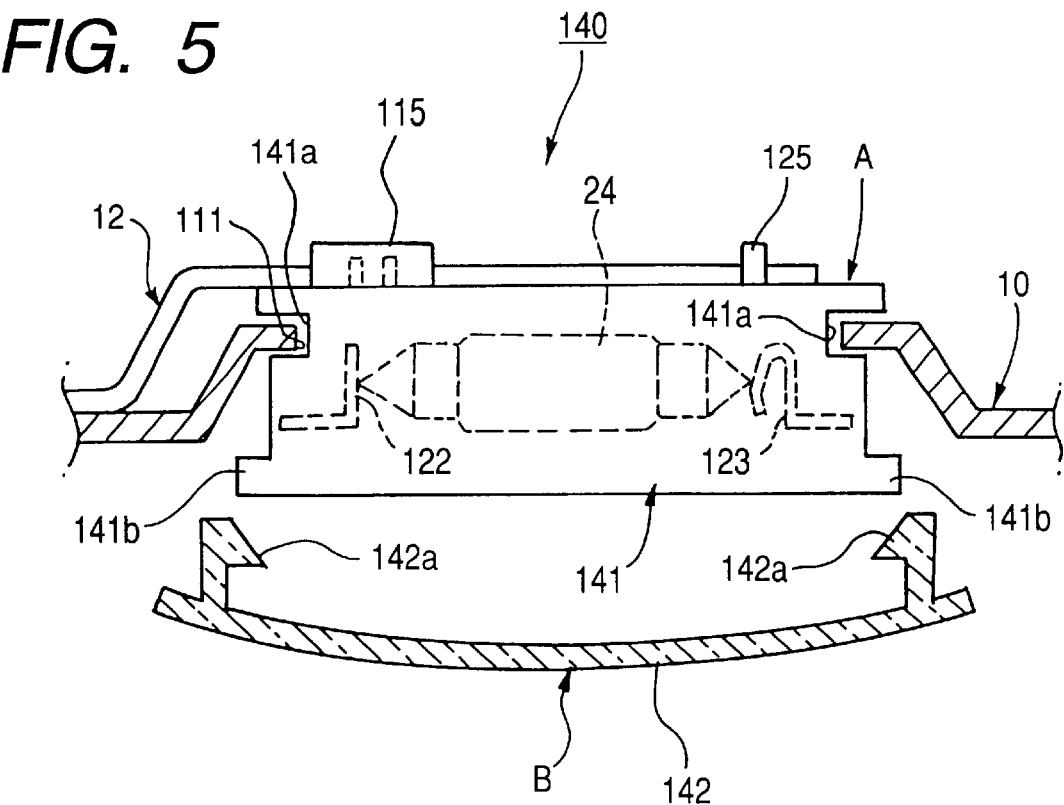
FIG. 5 is a longitudinal sectional view illustrating a process of mounting a room lamp to which a lamp unit mounting structure according to a third embodiment of the invention is applied.

FIG. 5 is a longitudinal sectional view illustrating a process of mounting a room lamp to which a lamp unit mounting structure according to a third embodiment of the invention is applied.

A room lamp 140, to which the lamp unit mounting structure according to the third embodiment of the invention is applied, comprises a functional portion A and a design portion B. The functional portion A includes a bulb 24 mounted in an opening provided in a housing 141, a tab terminal 122 and a spring terminal 123. The functional portion A is mounted in a lamp mounting window 111 of the roof trim 10. The design portion B is a cover lens 142 and mounted from the vehicle interior side onto the housing 141 of the roof trim 10. Incidentally, constituent members nearly similar to those of the room lamp 120 of the second embodiment are designated by like reference characters that denote the similar members of the second embodiment. Thus, the detail description of such constituent members is omitted herein.

The functional portion A of the room lamp 140 is directly mounted on the roof trim 10 without through the holder 129, through which the functional portion is mounted in the second embodiment of the invention, by fitting an opening edge of the lamp mounting window 111 of the roof trim 10 into a fitting groove 141a of the housing 141.

On the other hand, the cover lens 142 of the design portion B of the room lamp 140 is mounted on the housing 141 preliminarily provided in the lamp mounting window 111 in such a way as to cap the housing 141 from the vehicle interior side of the roof trim 10 (that is, from below, as viewed in FIG. 5). That is, the cover lens 142 is fixed to the housing 141 by engaging the latching claw 142a protruded from the top surface, as viewed in FIG. 5, with the engaging portion 141b protruded from the bottom edge of the housing 141, as viewed in FIG. 5.

Therefore, the room lamp 140 of the third embodiment has effects similar to those of the room lamp 120 of the second embodiment. Especially because of the fact that the housing 141 of the functional portion A of the lamp and the cover lens 142 of the design portion B are separated from each other, the housing 141 fixed to the connection portion of the FFC 12 is neither put into contact with other members nor damaged.

That is, only the housing 141 of the room lamp 140 is a member that is preliminarily fixed to the connection portion of the FFC 12 and that is easy to come in contact with another member when moved around together with the FFC 12. Moreover, there is no need for moving the cover lens 128, which is in possibility of being damaged so that the appearance of the lamp unit is deteriorated, together with the FFC 12.

Moreover, even in the case that the cover lens 142 of the room lamp 140 differs from that of another lamp unit according to the types of vehicles, the housing 141 can be used in common by the lamp units. Thus, it is sufficient to change only the cover lens 142 so as to manufacture the lamp units. Consequently, the manufacturing cost of the room lamps 140 is reduced.

Fourth Embodiment

Figure 6:
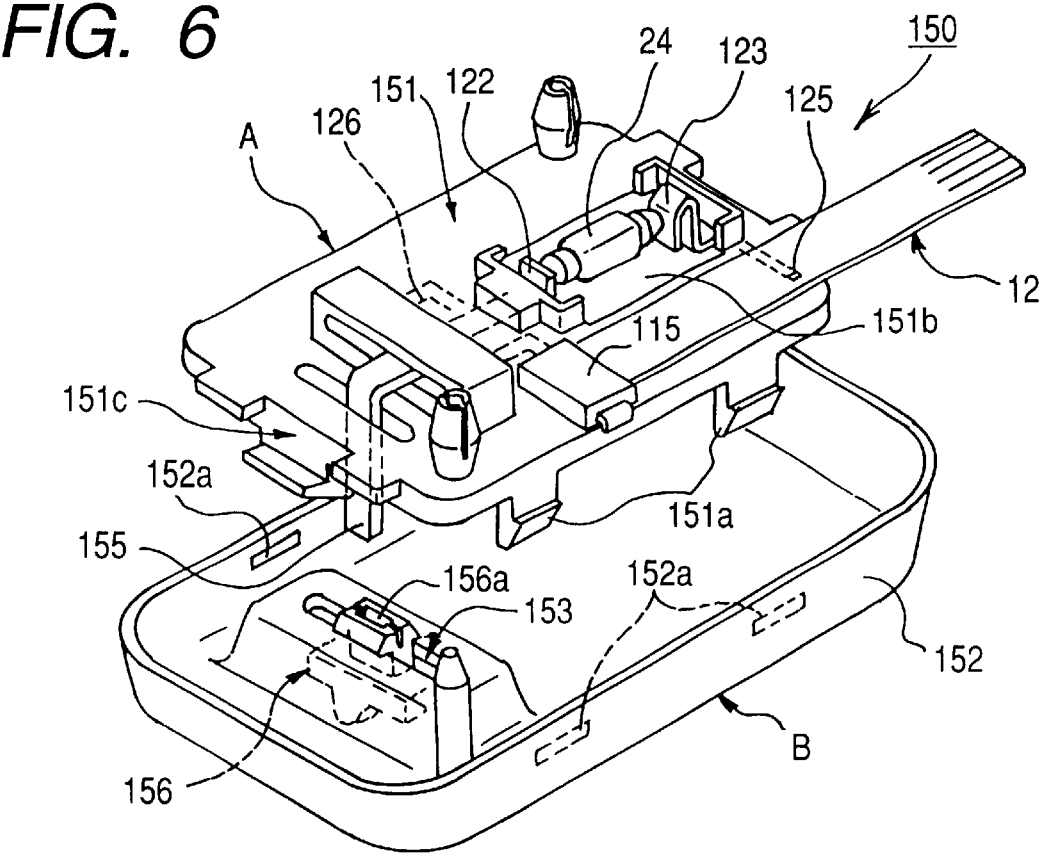
FIG. 6 is an exploded perspective view illustrating a room lamp to which a lamp unit according to a fourth embodiment of the invention is applied.

A room lamp 150, to which the lamp unit mounting structure according to the fourth embodiment illustrated in FIG. 6 is applied, comprises a functional portion A and a design portion B. The functional portion A includes a bulb 24 mounted in an opening 151b provided in a housing 151, a tab terminal 122 and a spring terminal 123 serving as bulb contacts, a switch connecting portion 126, and a switch lever 155. The functional portion A is mounted in a lamp mounting window 111 of the roof trim (not shown). The design portion B is a cover lens 152 and mounted from the indoor side onto the housing 151 of the roof trim. Incidentally, constituent members nearly similar to those of the room lamps 120 and 140 of the second and third embodiments are designated by like reference characters that denote the similar members of the second and third embodiments. Thus, the detail description of such constituent members is omitted herein.

A switch knob 156 having predetermined color and shape is preliminarily and slidably fitted into a fitting groove 153 provided in the cover lens 152 of the fourth embodiment. When the cover lens 152 is assembled to the housing 151, the end portion of the switch lever 155 is fitted into the fitting portion 156a of the switch knob 156. Thus, the switch lever 155 is operated by using the switch knob 156 from the indoor side.

The functional portion A of the room lamp 150 is directly mounted to the roof trim by fitting an opening edge of the lamp mounting window of the roof trim (not shown) into a fitting portion groove 151c of the housing 151, similarly as the case of the room lamp 140 of the third embodiment.

On the other hand, the cover lens 152 of the design portion B of the room lamp 150 is mounted on the housing 151 preliminarily provided in the lamp mounting window to cap the housing 151 from the vehicle interior side of the roof trim. That is, the cover lens 152 is fixed to the housing 151 by engaging the engaging portion 152a, which is provided by denting the inner circumferential wall, with the latching claw 151a protruded from the bottom edge of the housing 151.

In addition to the effects similar to those of the room lamp 140 of the third embodiment, the room lamp 150 of the fourth embodiment has the following effects. That is, even when the switch knob 156 of the room lamp 150 changes according to kinds of the interior of the vehicle, the housing 151 can be used in common. Thus, it is sufficient to change only the switch knob 156, the color and shape corresponding to the kind of interior. Consequently, the cost of the room lamp 150 is reduced. Further, the engagement between the switch knob 156 and the switch lever 155 is performed simultaneously with the operation of assembling the cover lens 152 to the housing 151. Consequently, the number of man-hours needed for the assembling operation does not increase.

Fifth Embodiment

Figure 7:
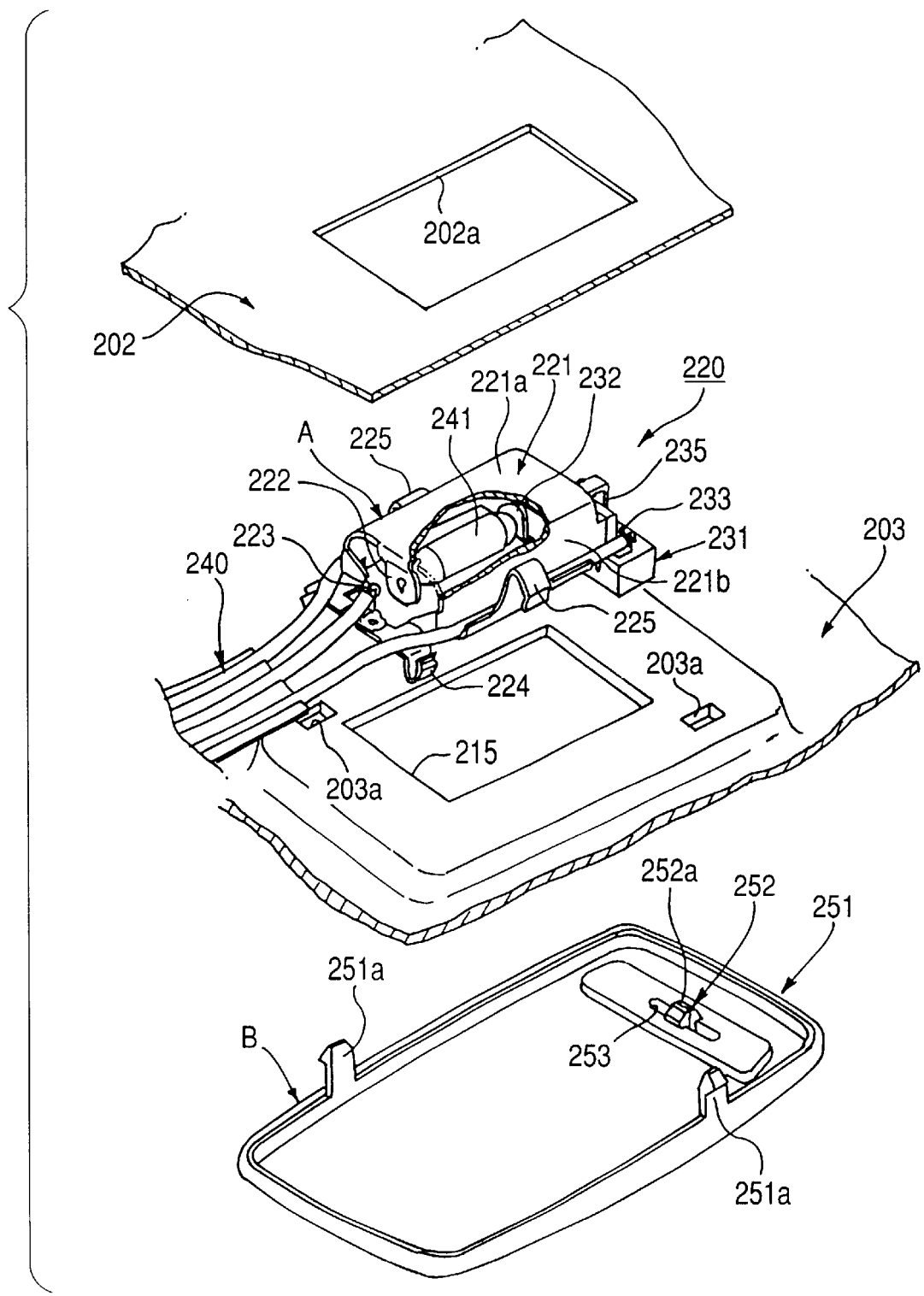
FIG. 7 is a perspective view illustrating a process of mounting a room lamp, to which a lamp unit mounting structure according to a fifth embodiment of the invention is applied, onto a roof trim.
Figure 8:
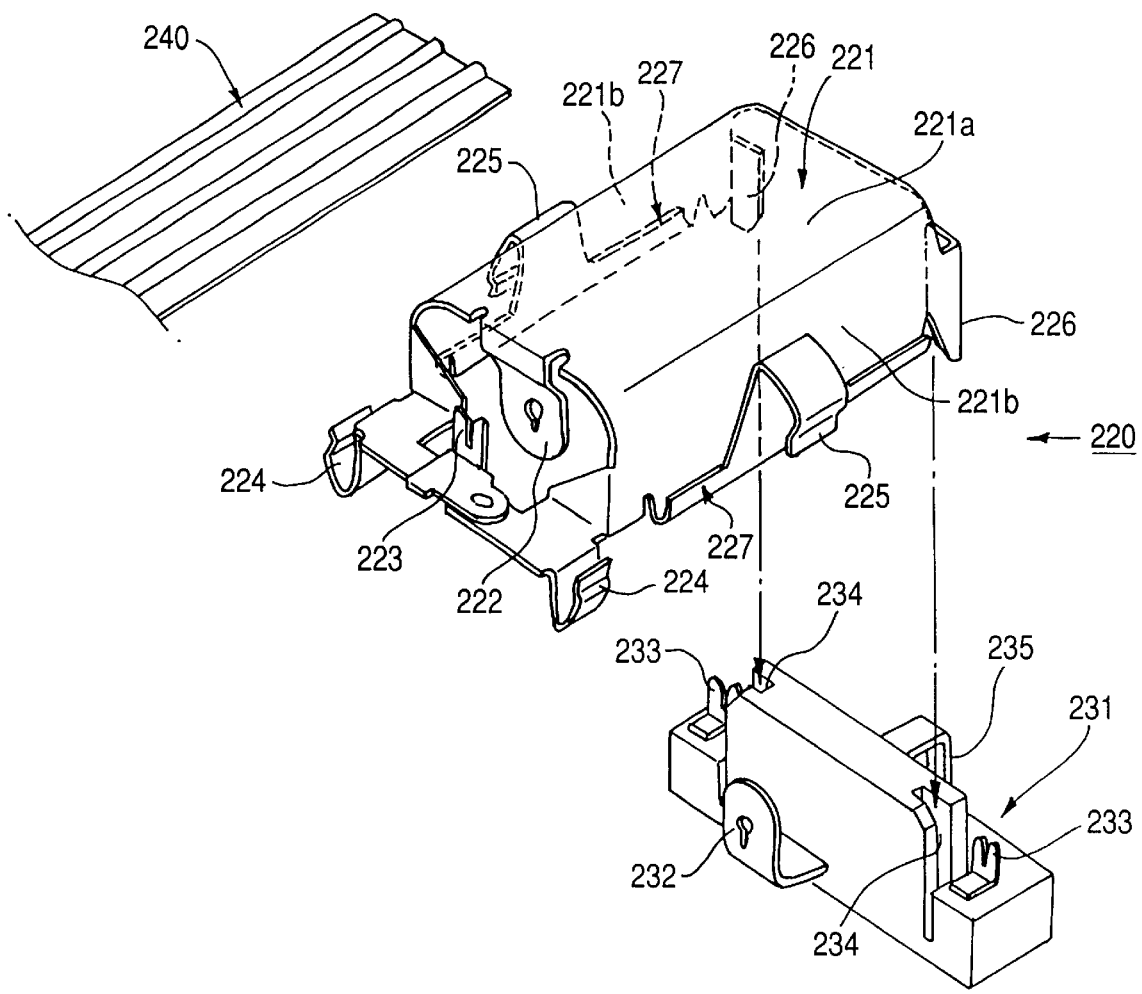
FIG. 8 is an exploded perspective view illustrating a functional portion of the room lamp shown in FIG. 7.
Figure 9:
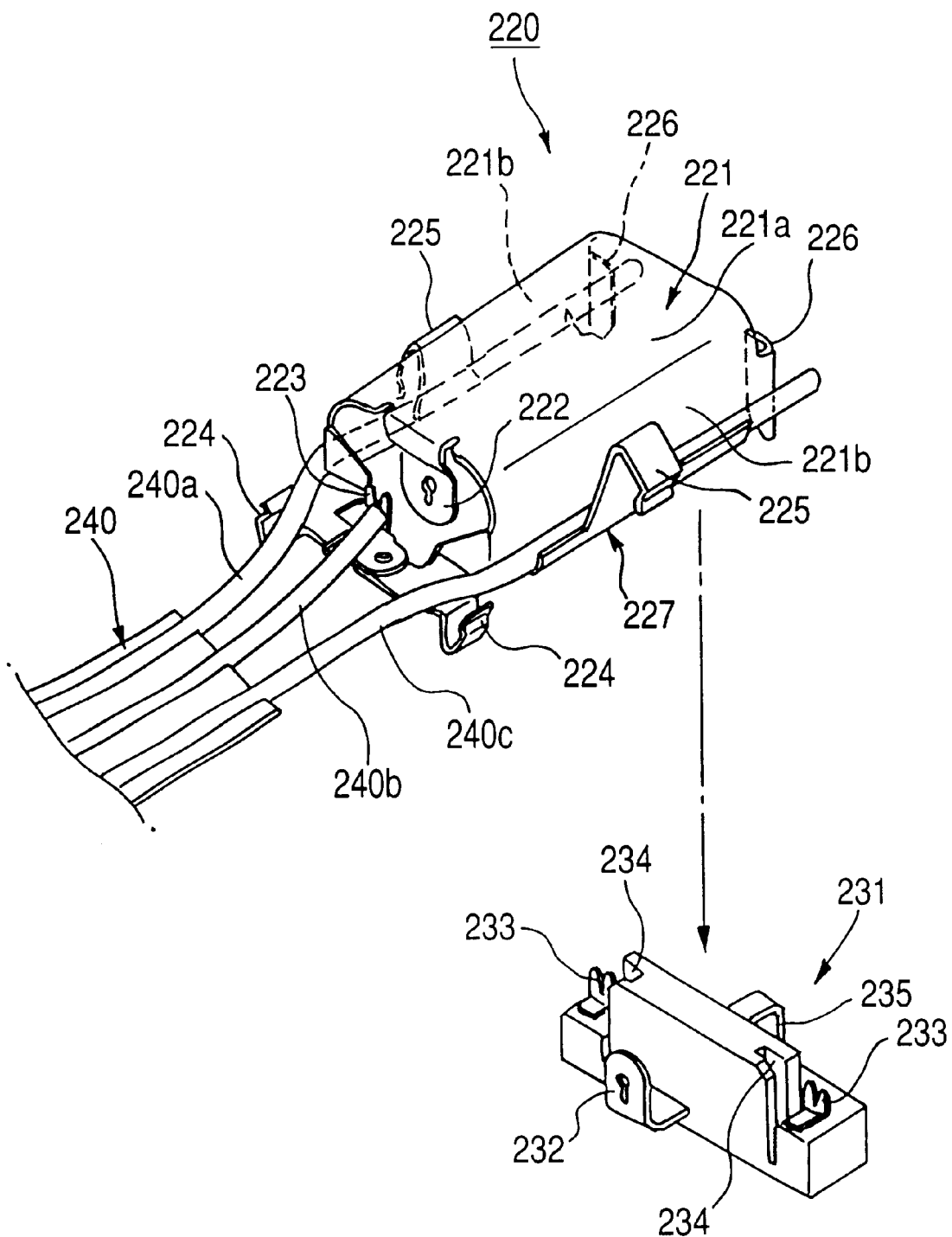
FIG. 9 is a perspective view illustrating a procedure for assembling the functional portion shown in FIG. 8.
Figure 10:
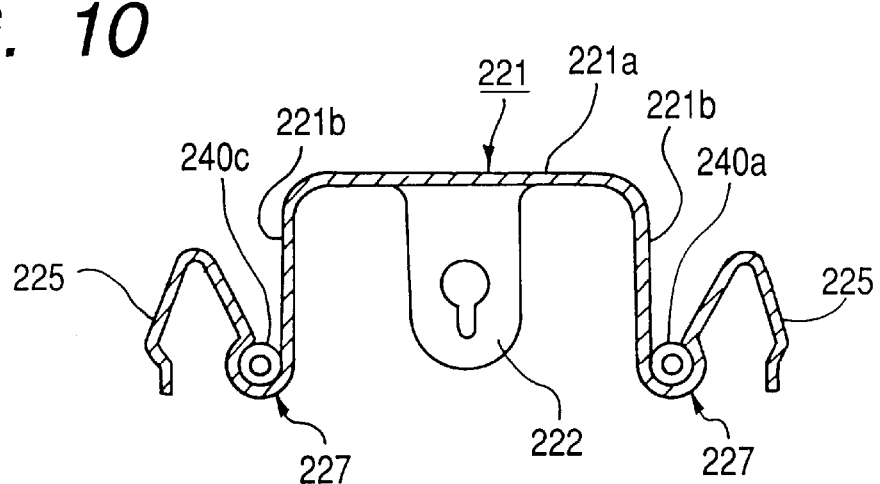
FIG. 10 is a transversal sectional view illustrating a reflector shown in FIG. 9.

FIG. 7 is a perspective view illustrating a process of mounting a room lamp, to which a lamp unit mounting structure according to a fifth embodiment of the invention is applied, onto a roof trim. FIG. 8 is an exploded perspective view illustrating a functional portion of the room lamp shown in FIG. 7. FIG. 9 is a perspective view illustrating a procedure for assembling the functional portion shown in FIG. 8. FIG. 10 is a transversal sectional view illustrating a reflector shown in FIG. 9.

A room lamp 220 of the fifth embodiment illustrated in FIG. 7 is a lamp unit to be mounted in a lamp mounting window 215 opened in a roof trim 203 serving as an interior wall member covering a body roof 202, which is a vehicle body panel.

As illustrated in FIGS. 7 and 8, the room lamp 220 comprises a functional portion A and a design portion B. The functional portion A includes a reflector 221 in which one of bulb contacts 222 is provided, a switch unit 231 in which the other bulb contact 232 is provided, and a bulb (that is, an electric bulb) 241 mounted between the bulb contacts 222, 232. The functional portion A is mounted onto a vehicle body panel side portion of the roof trim 203. The design portion B including a cover lens 251 is mounted onto an indoor side portion of the roof trim 203.

The reflector 221 is integrally formed by performing press-forming on an electrically conductive metallic plate, such as stainless steel. The reflector 221 has the function of realizing the optimum luminous intensity distribution of the bulb 241 and also has the function serving as a structural support for the functional portion A.

As shown in FIG. 8, the bulb contact 222 formed by bending the end edge of the top wall 221a at a nearly right angle, a pair of trim mounting portions 224, 224 serving as the latching member which is bent-formed and enabled to be engaged with the opening edge of the lamp mounting window 215, and a pressure-contact terminal 223 serving as the cable connecting portion of the reflector 221, are provided at one of longitudinal open end portions (at the left side, as viewed in FIG. 8) of the reflector 221 bent-formed in such a manner as to have a nearly U-shaped section.

A pair of guide projections 226, 226 are respectively bent-formed on the end edges of both side walls 221b, 221b at the side of the other longitudinal open end portion of the reflector 221.

A pair of panel mounting portions 225, 225 engageable with the opening 202a of the body roof 202, and a cable holding portion 227 for guiding branch lines 240a, 240c of the FFC (flexible flat cable) 240 to the reflector 221 and holding the branch lines are formed on the bottom edges of the opposite side walls 221b, 221b by being bent (see FIGS. 9 and 10).

The cable holding portions 227, 227 are cable holding grooves formed by bending the bottom edges of the opposite side walls 221b, 221b so that each of these holding portions has a C-shaped section, as illustrated in FIG. 10. These holding portions are enabled to guide and hold the branch lines 240a, 240c press-fitted from the top opening, whose width is less than a diameter of each of the branch lines 240a, 240c.

The switch unit 231 includes a switch circuit (not shown) connected to the bulb contact 232 and accommodated in an insulating housing, and pressure-contact terminals 233, 233 serving as the cable connecting portions of this switch circuit which are provided in such a manner as to be exposed to the outside, similarly as the bulb contact 232.

The switch unit 231 is provided with a switch lever 235 for controlling a switch circuit between ON and OFF states of the bulb 241.

Thus, first, the branch line 240b of the FFC 240 serving as a cable of a roof harness is pressure-contacted to the pressure-contact terminal 223 provided at one of the longitudinal open end portions of the reflector 221, as illustrated in FIG. 9. The cable holding portions 227, 227 are caused to guide and hold the branch lines 240a, 240c of the FFC 240 arranged in such a manner as to extend to the other of the longitudinal open end portions of the reflector 221 along the outer side surfaces of the opposite side walls 221b, 221b.

Subsequently, the switch unit 231 and the reflector 221 are assembled into one piece by fitting guide projections 226, 226 of the reflector 221 into the fitting grooves 234, 234 provided in the switch unit 231. Simultaneously, the branch lines 240a and 240c of the FFC 240 are pressure-contacted to the pressure-contact terminals 233, 233. Then, the bulb 241 is inserted between both the opposed bulb contacts 222, 232, so that the assembling of the functional portion A is complete.

The connection portions of the branch lines 240a, 240b, 240c of the FFC 240 serving as a roof harness preliminarily arranged on the roof trim 203 are pressure-fixed to the pressure-contact terminals 223, 233, 233 of the reflector 221 and the switch unit 231 of the functional portion A of the lamp unit, and thus electrically connected thereto. At this time, a worker can visually check the connection state thereof and fixes the cable to the lamp unit by working in a downward posture. Incidentally, although the connection portions of the FFC 240 are weld-fixed to the pressure-contact terminals 223, 233, 233, other fixing method, such as welding method, may be employed.

The cover lens 251 is mounted in the lamp mounting window 215 of the roof trim 203 by engaging the latching projection 251a with the latching hole 203a of the roof trim 203 in such a way as to cover the window 215.

The switch knob 252 having predetermined color and shape is preliminarily and slidably fitted into the sliding groove 253 provided in the cover lens 251. When the cover lens 251 is assembled to the roof trim 203, the end portion of the switch lever 235 is fitted into the fitting portion 252a of the switch knob 252. Then, the switch lever 235 is operated from the vehicle interior side by using the switch knob 252.

Figure 24:
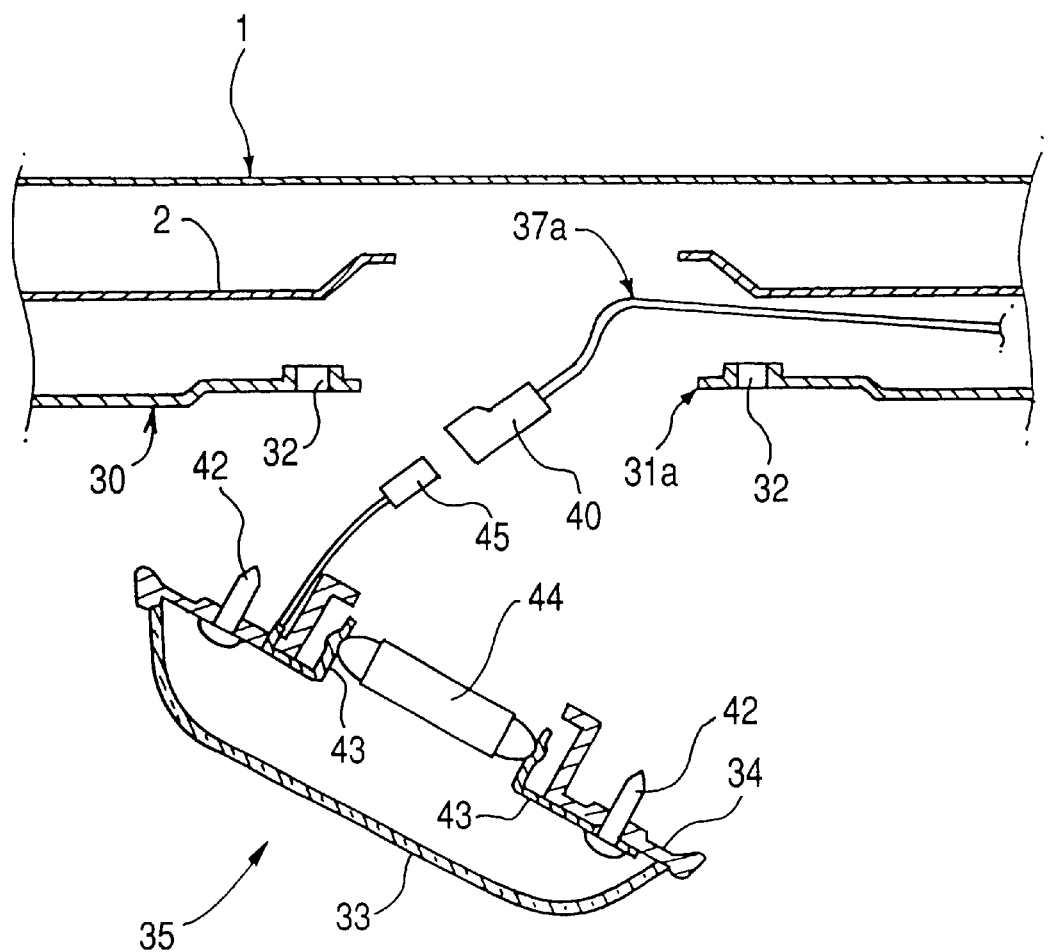
FIG. 24 is a sectional view illustrating a room lamp mounting structure shown in FIG. 23.
Figure 25:
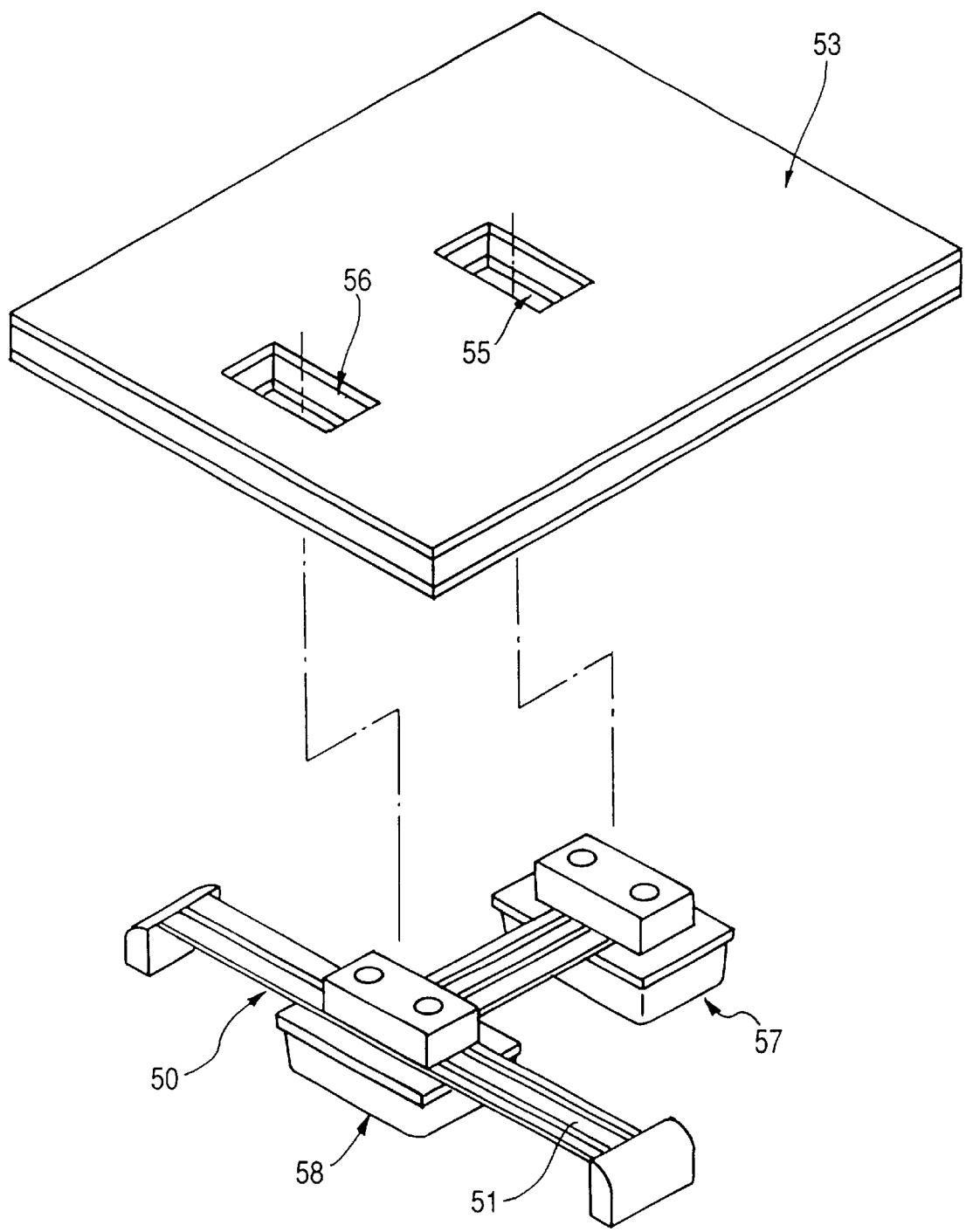
FIG. 25 is a schematic view illustrating another related lamp unit mounting structure.
Figure 26:
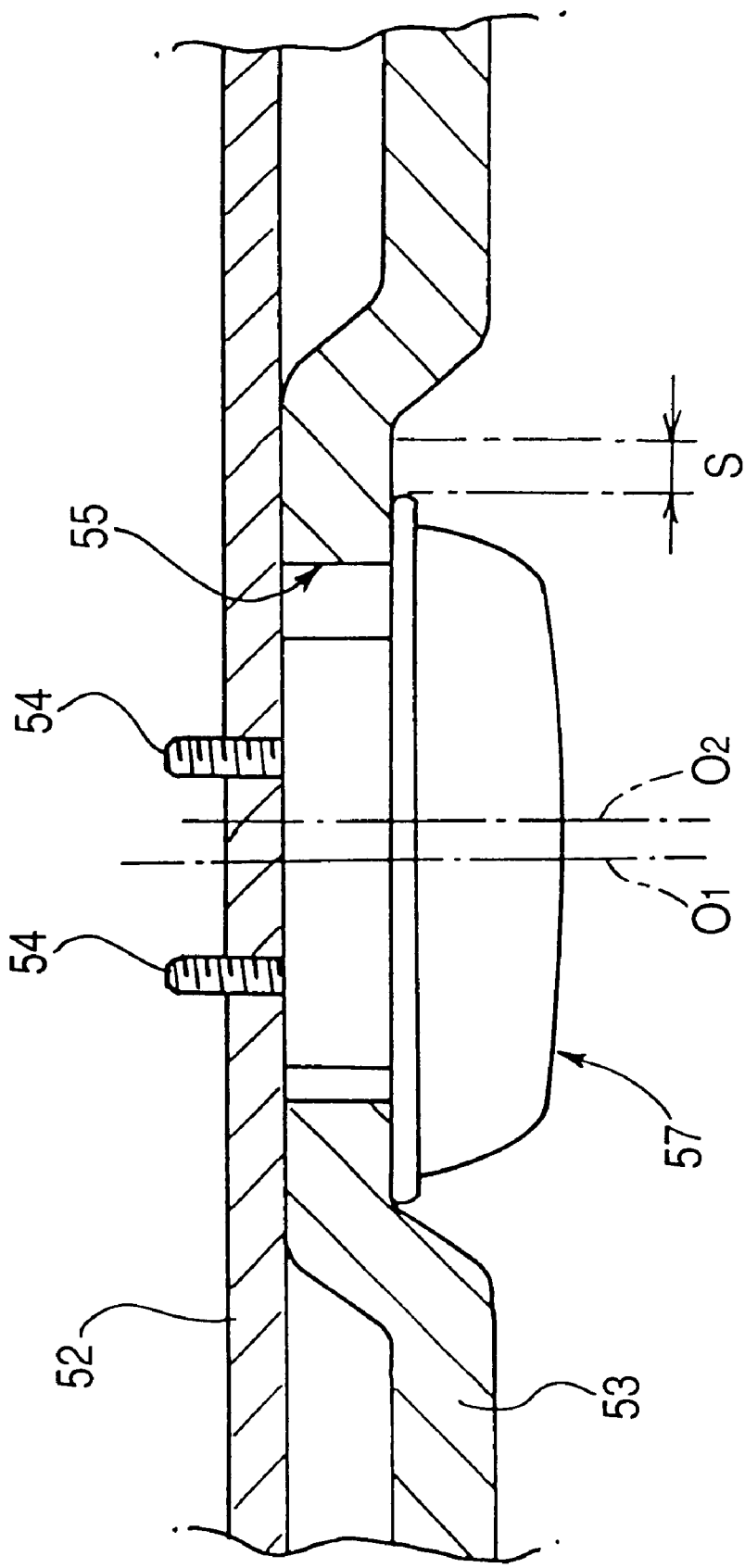
FIG. 26 is a sectional view illustrating a primary portion of the lamp unit mounting structure shown in FIG. 25.

That is, in the room lamp 220 of the fifth embodiment, the bulb 241 is mounted between the bulb contact 222 of the reflector 221 which is integrally formed from an electrically conductive material to serve as a circuit conductor, and the bulb contact 232 of the switch unit 231. The connection portions of the FFC 240 are directly fixed to the pressure-contact terminals 223, 233, 233 of the reflector 221 and the switch unit 231 of the functional portion A. This eliminates the necessity for additionally providing conductors, such as a bus bar, and connector portions in the functional portion A. The number of components of this functional portion A is reduced, as compared with that of components of the functional portion of the conventional lamp unit shown in FIG. 24.

Thus, the manufacturing and machining cost of the components can be cut down by reducing the number of components. Moreover, the assembling operation is simplified. Consequently, the manufacturing cost is decreased.

Further, when the roof module is formed by preliminarily mounting the room lamp 220 of the fifth embodiment to the roof trim 203, the functional portion A connected to the connection portion of the FFC 240 is first mounted in the lamp mounting window 215, which is opened in the roof trim 203, as illustrated in FIG. 7.

At that time, the trim mounting portions 224, 224, of the reflector 221 are engaged with the opening edge of the lamp mounting window 215, so that the functional portion A is directly connected to the roof trim 203. These trim mounting portions 224, 224 are flexible latching pieces, which are adapted to elastically deform in opposite directions, respectively, and engaged without backlash.

Further, the branch lines 240a, 240c arranged along the outer side surface of the opposite side walls 221b, 221b of the reflector 221 are guided and held by the cable holding portions 227, 227. Therefore, the branch lines 240a, 240a are not bitten between the reflector 221 and the lamp mounting window 215. Consequently, the workability thereof is good.

Furthermore, since the branch lines 240a and 240c are press-fitted into the cable holding portions 227, 227 and the FFC 240 is held by and fixed to the function portion A, the cable holding portions 227, 227 also serve as the cable fixing member for preventing a pulling force from acting upon the connection portions of the branch lines 240a and 240c.

Therefore, the fixed part is reliably prevented from being disconnected from the pressure-contact terminals 233, 233 by a pulling force that is generated owing to oscillations caused when the FFC 240 is arranged on the roof trim 203 or when the vehicle runs, and that acts upon the connection portions of the branch lines 240a, 240a.

On the other hand, the cover lens 251 of the design portion B of the room lamp 220 is mounted by capping on the functional portion A preliminarily mounted on the lamp mounting window 215, from the vehicle interior side of the roof trim 203. That is, the cover lens 251 is mounted by engaging the latching projection 251a, provided on the circumferential wall in such a way as to protrude therefrom, with the engaging hole 203a of the roof trim 203 in such a manner as to cover the lamp mounting window 215 of the roof trim 203.

Subsequently, the FFC 240 is arranged on a vehicle body panel side portion (that is, a top side portion, as viewed in FIG. 7) of the roof trim 203. Moreover, the components to be mounted on the roof, such as a rearview mirror and a sun visor, (not shown) are preliminarily mounted on the roof trim 203. Thus, a roof module in which these roof-mounted components are integral with the roof trim 203 is constructed.

Therefore, the assembling operation is completed by only mounting the roof module on the body roof 202. The operation of mounting the roof-mounted components can be omitted when the roof trim is mounted. Consequently, the assembling operation is simplified.

That is, according to the lamp unit mounting structure of the fifth embodiment, the connection portions of the branch lines 240a, 240b, 240c of the FFC 240 preliminarily arranged on the roof trim 203 are fixed to the pressure-contact terminals 223, 233, 233 of the reflector 221 and the switch unit 231 of the functional portion A. The functional portion A of the room lamp 220 is simultaneously mounted in the lamp mounting window 215 when the FFC 240 is arranged on the roof trim 203.

Thus, the room lamp 220 and the FFC 240 are put into a state that the room lamp 220 and the FFC 240 are electrically connected to each other, without using the connectors. Further, the room lamp 220 and the FFC 240 which are put into such a state, and the roof trim 203 which is not assembled to the body roof 202 yet, are integrally formed and modularized. Then, the module in which the room lamp 220, the FFC 240, and the roof trim 203 are integral with one another is assembled to the body roof 202, so that the assembling operation is completed.

At that time, the panel mounting portions 225, 225 of the reflector 221 are engaged with the opening 202a of the body roof 202. Thus, the room lamp 220 is positioned at and fixed to the body roof 202. These panel mounting portions 225, 225 are flexible latching pieces which are adapted to be elastically deformed in opposite directions and that are enabled to absorb some positional displacement.

Therefore, when the roof trim is mounted, the operation of assembling the roof-mounted components can be omitted. The assembling operation, which has conventionally been overhead work performed in a narrow working space, is simplified. Thus, good workability is obtained.

The electrical connection between the branch lines 240a, 240b, 240c of the FFC 240 and the pressure-contact terminals 223, 233, 233 is established by a worker who visually checks the connection state thereof and fixes the FFC 240 to the pressure-contact terminals by working in a downward posture. Therefore, high reliability of the connection therebetween is obtained, regardless of the accuracy of mounting of the roof trim 203 onto the body roof 202.

Further, in the room lamp 220, the reflector 221 of the functional portion A is separated from the cover lens 251 of the design portion B. Therefore, even when the reflector 221 and the switch unit 231 fixed to the connection portions of the FFC 240 are transported together with the FFC 240, and when the reflector 221 and the switch unit 231 are mounted on the roof trim 203, the cover lens 251 is neither brought into contact with other members nor damaged.

That is, only the reflector 221 and the switch unit 231 of the room lamp 220 are members that are preliminarily fixed to the connection portion of the FFC 240 and that are easy to come in contact with other members when moved around together with the FFC 240. Moreover, there is no need for moving the cover lens 251, which is in possibility of being damaged so that the appearance of the lamp unit is deteriorated, together with the FFC 240.

Moreover, even in the case that the cover lens 251 and the switch knob 252 of the room lamp 220 differ from those of another lamp unit according to the types of vehicles, the reflector 221 and the switch unit 231 can be used in common by the lamp units. Thus, it is sufficient to change only the cover lens 251 and the switch knob 252 so as to manufacture the lamp units. Consequently, the manufacturing cost of the room lamps 220 is reduced.

Incidentally, needless to say, the constituent elements, such as the vehicle body panel, the interior wall member, the lamp unit, the reflector, the switch unit, the cable connecting portions and the cables, are not limited to those of the aforementioned first to fifth embodiments. Various modifications may be made according to the gist of the invention.

For example, the configuration of the cable holding portion for guiding the branch lines 240a and 240c to the reflector and holding these branch lines is not limited to that of the cable holding portion 227 of the aforementioned reflector 221. Various changes and modifications thereof may be made.

Figure 11:
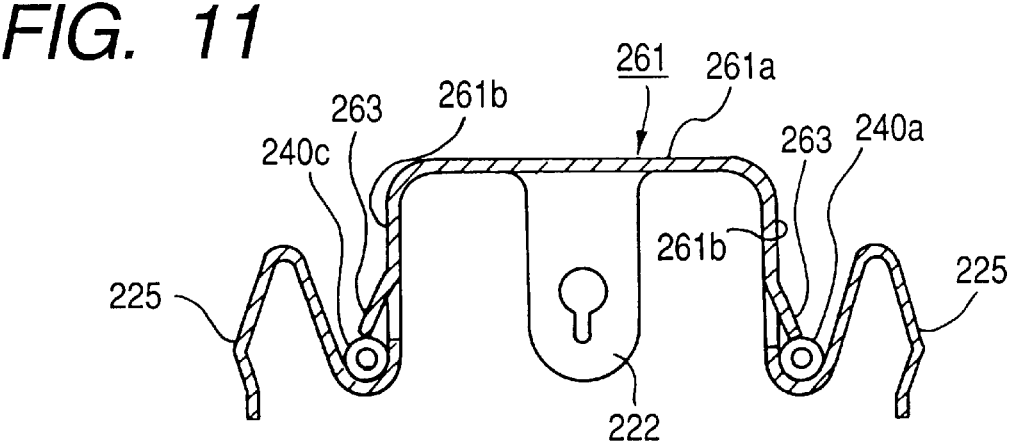
FIG. 11 is a transversal sectional view illustrating a modification of the reflector shown in FIG. 10.

In the reflector 261 shown in FIG. 11, the bottom edges of both the side walls 261b and 261b are bent so that the cable holding groove is formed in such a way to have a U-shaped section. Then, elastic latching pieces 263 are formed above the cable holding grooves as slip-off preventing member by cut-erecting these pieces. Moreover, the branch lines 240a, 240c are led to the reflector 221 and fixed thereto by simultaneously holding these branch lines.

Figure 12:
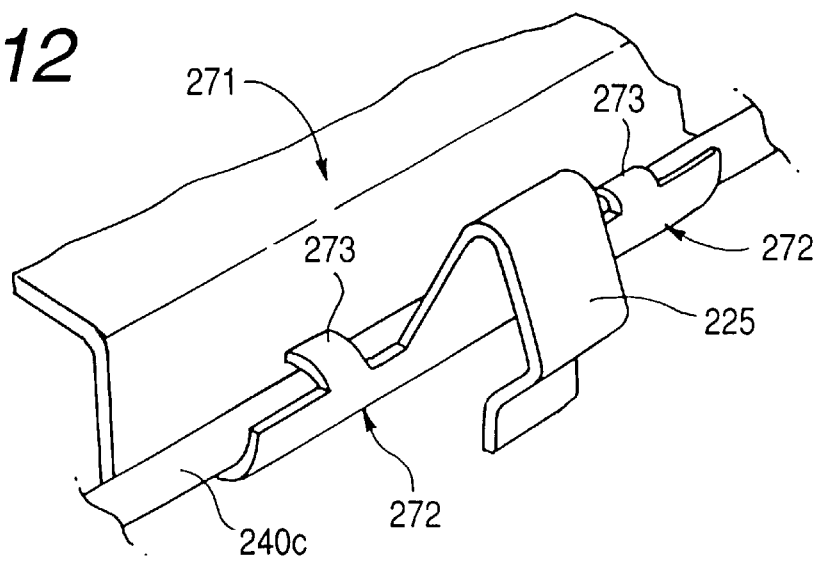
FIG. 12 is an enlarged perspective view illustrating a primary portion of the reflector shown in FIG. 10.

Further, the branch line 240c is inserted into the cable holding groove formed by bending the bottom edges of both the side walls in such a manner as to have a U-shaped section, similarly as the cable holding portion 272 of the reflector 271 shown in FIG. 12, the branch line 240c. Thereafter, the branch lines are held and fixed by being caulked with a caulking piece 273.

Sixth Embodiment

Figure 13:
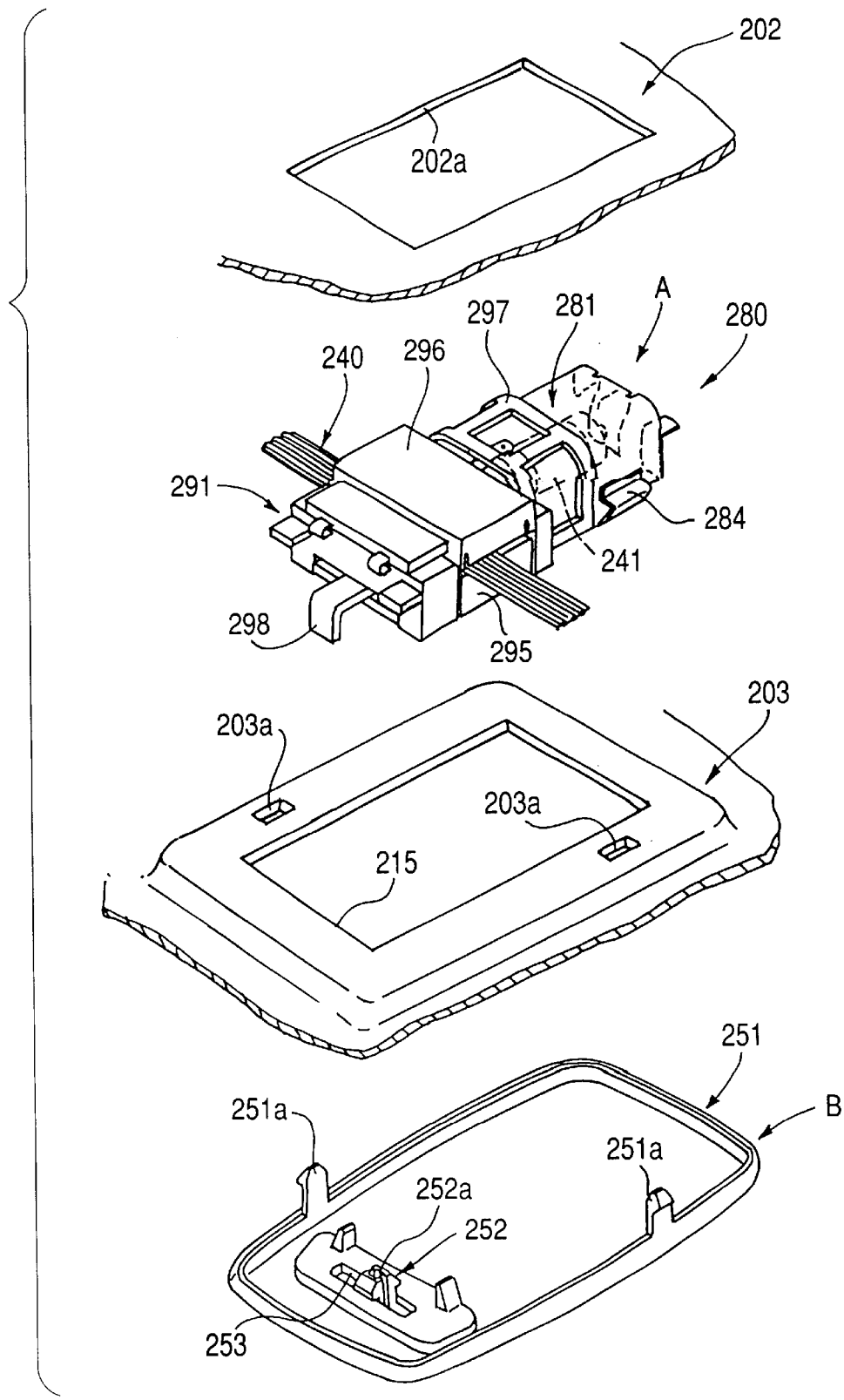
FIG. 13 is a perspective view illustrating a process of mounting a room lamp, to which a lamp unit mounting structure according to a sixth embodiment of the invention is applied, onto a roof trim.
Figure 14:
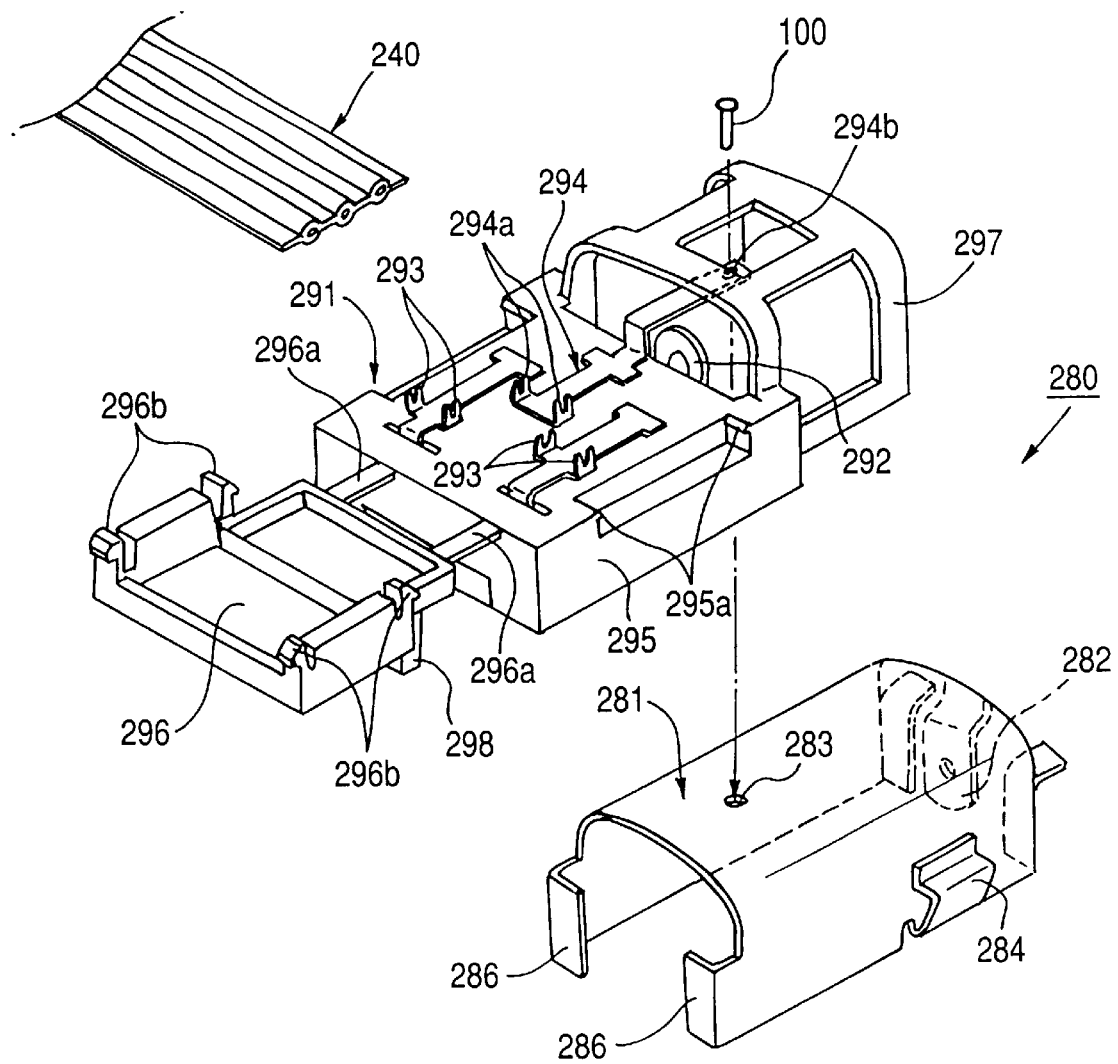
FIG. 14 is an exploded perspective view illustrating a functional portion of the room lamp shown in FIG. 13.

FIG. 13 is a perspective view illustrating a process of mounting a room lamp, to which a lamp unit mounting structure according to a sixth embodiment of the invention is applied, onto a roof trim. FIG. 14 is an exploded perspective view illustrating a functional portion of the room lamp shown in FIG. 13.

As illustrated in FIGS. 13 and 14, the room lamp 280 comprises a functional portion A and a design portion B. The functional portion A includes a reflector 281 in which one of bulb contacts 282 is provided, and a switch unit 291 in which the other of the bulb contacts 292 is provided, and a bulb (that is, an electric bulb) 241 mounted between the bulb contacts 282, 292. The functional portion A is mounted onto a vehicle body panel side portion of the roof trim 203. The design portion B, which is a cover lens 251, is mounted onto a vehicle interior side portion of the roof trim 203. Incidentally, the constituent members of the room lamp, which are similar to those of the room lamp 220 in the fifth embodiment, are designated by like reference characters that denote those of the latter room lamp 220. Thus, the detail description of such constituent members is omitted herein.

The reflector 281 is integrally formed by performing press-forming on an electrically conductive metallic plate, such as stainless steel, similarly as the reflector 221 of the fifth embodiment.

As shown in FIG. 14, the bulb contact 282, formed by being bent in a direction nearly perpendicular to the end edge of the top wall, is provided at one of longitudinal open end portions of the reflector 281 bent-formed in such a manner so as to have a nearly U-shaped section (at the right side, as viewed in FIG. 14). Moreover, a pair of guide projections 286, 286 are bent-formed on the end edges of opposite side walls at the side of the other longitudinal open end portion (that is, the left side, as viewed in FIG. 14) of the reflector 281.

Each of a pair of trim mounting portions 284, 284 engageable with the lamp mounting window 215 is bend-formed on the bottom edges of the opposite side walls of the reflector 281. A fixing hole 283 for riveting the bus bar 294 serving as the cable connecting portion of the reflector 281 (to be described later) is formed through the top wall of the reflector 281. Incidentally, although the bus bar 294 is fixed to the reflector 281 in the sixth embodiment, other fixing method, such as press-fitting method, may be employed.

As shown in FIG. 14, in the switch unit 291, a switch circuit (not shown) connected to the bulb contact 292 is accommodated in an insulating housing 295. Pressure-contact terminals 293, 293 serving as the cable connecting portions of the switch circuit are provided on the insulating housing 295 in such a way as to project therefrom and as to be exposed to the outside.

The switch unit 291 is provided with a switch lever 298 for controlling a switch circuit to switch between ON and OFF states of the bulb 241.

The pressure-contact terminal 294a of the bus bar 294 connected to the reflector 281 and each of the pressure-contact terminals 293, 293 are disposed on the top surface of the insulating housing 295 so that pressure-contact blades are directed toward the same direction and placed in parallel with one another, as illustrated in FIG. 14.

That is, the pressure-contact terminal 294a of the bus bar 294 serving as the cable connecting portion of the reflector 281 is disposed in the proximity of the pressure-contact terminals 293 and 293 serving as the cable connecting portions of the switch unit 291 so that these pressure-contact terminals are placed in juxtaposition with each other.

The insulating housing 295 has a strain relief cover 296 and a reflector protection cover 297, which are integrally formed through flexible hinges 296a, 296a.

The guide projection 286, 286 of the reflector 281 is fitted into the fitting groove (not shown) provided in the insulating housing 295 so that the switch unit 291 and the reflector 281 are integrally assembled. Consequently, a part of the top surface of the reflector 281 is covered with the reflector protection cover 297.

Subsequently, the FFC 240 is pressure-connected to the pressure-contact terminals 294a, 293 and 293 disposed on the top surface of the insulating housing 295. Simultaneously with this, a through hole 294b of the bus bar 294 and the fixing hole 283 of the reflector 281 are caulked with rivets 100. Consequently, the bus bar 294 and the reflector 281 are electrically connected to each other.

Then, the strain relief cover 296 is closed. Each of the latching claws 296b is locked to the corresponding the latching projection 295a of the insulating housing 295. Thus, the FFC 240 is held by and fixed to the functional portion A.

Finally, the bulb 241 is inserted into between both the opposed bulb contacts 292, 282. Thus, the assembling of the functional portion A is completed.

That is, in the room lamp 280 of the sixth embodiment, the pressure-contact terminal 294a of the bus bar 294 serving as the cable connecting portion of the reflector 281 is disposed in the vicinity of the pressure-contact terminals 293, 293 so that these pressure-contact terminals are placed in juxtaposition with each other at predetermined intervals. Thus, the conductors of the FFC 240 can be collectively pressure-connected to the pressure-contact terminals 293, 293, 294a without branching and cutting the conductors of the FFC 240.

Consequently, the sixth embodiment has an advantageous effect in that operations of pressure-connecting the conductors of the FFC 240 can be collectively performed, in addition to the effects of the room lamp 220 of the fifth embodiment, for example, the effect that a worker can visually check the connection state thereof and fix the cable to the lamp unit by working in a downward posture. Thus, the assembling workability is enhanced. Consequently, the efficiency in production of the lamp units is increased.

Furthermore, the utilization of the FFC 240 enables a terminal to process the pressure-connection between the FFC and each of the pressure-contact terminals, and also enables the fabrication of a through circuit. Thus, the flexibility in designing the arrangement path of a roof harness is increased.

Further, when the room lamp 280 in the sixth embodiment is preliminarily mounted to the roof trim 203 to form a module, the assembling of the room lamp is performed by following the procedure similar to that for assembling the room lamp in the fifth embodiment. Thus, the sixth embodiment has effects similar to those of the fifth embodiment.

Seventh Embodiment

Figure 15:
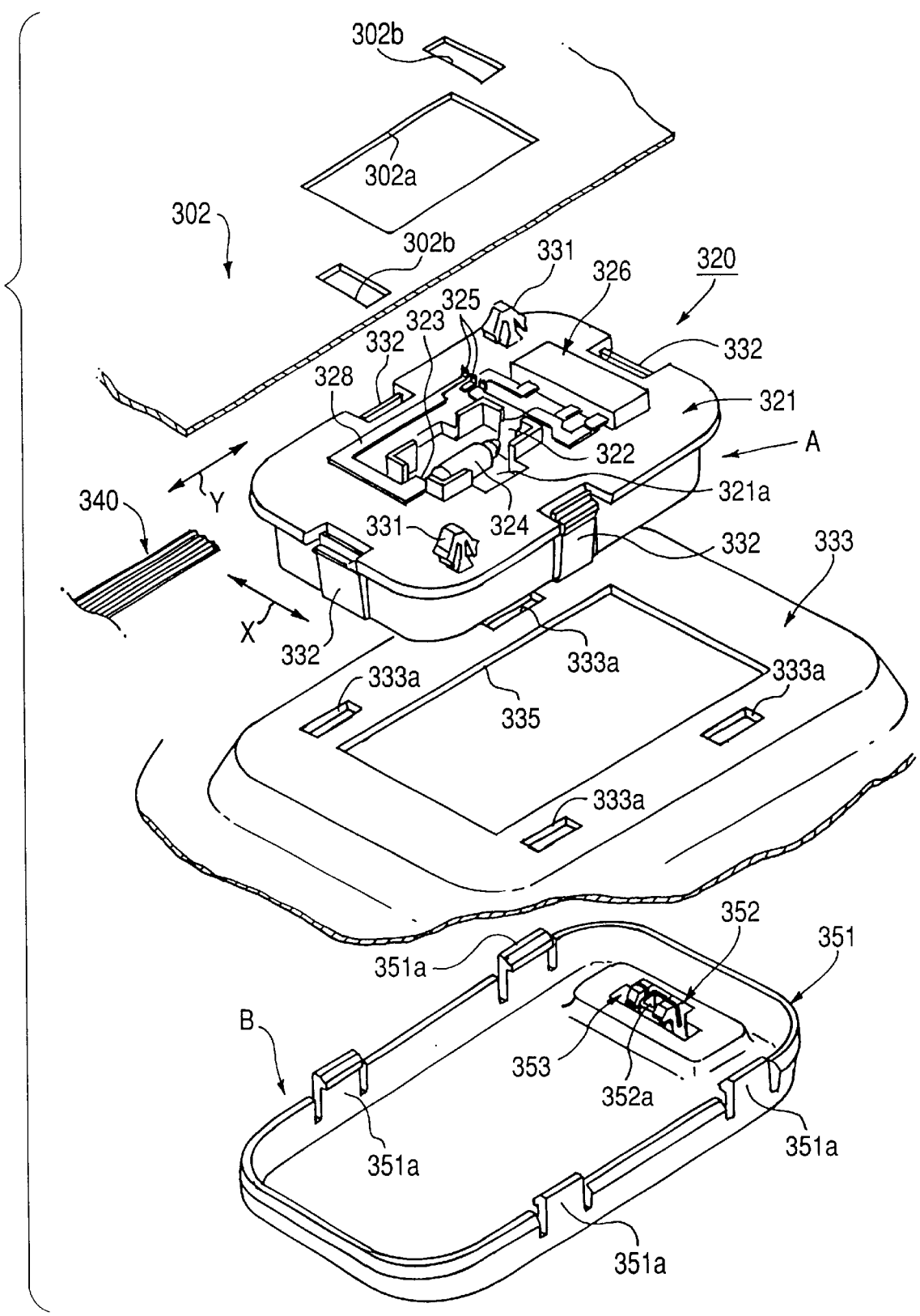
FIG. 15 is an exploded perspective view illustrating a room lamp to which a lamp unit mounting structure according to a seventh embodiment of the invention is applied.
Figure 16:
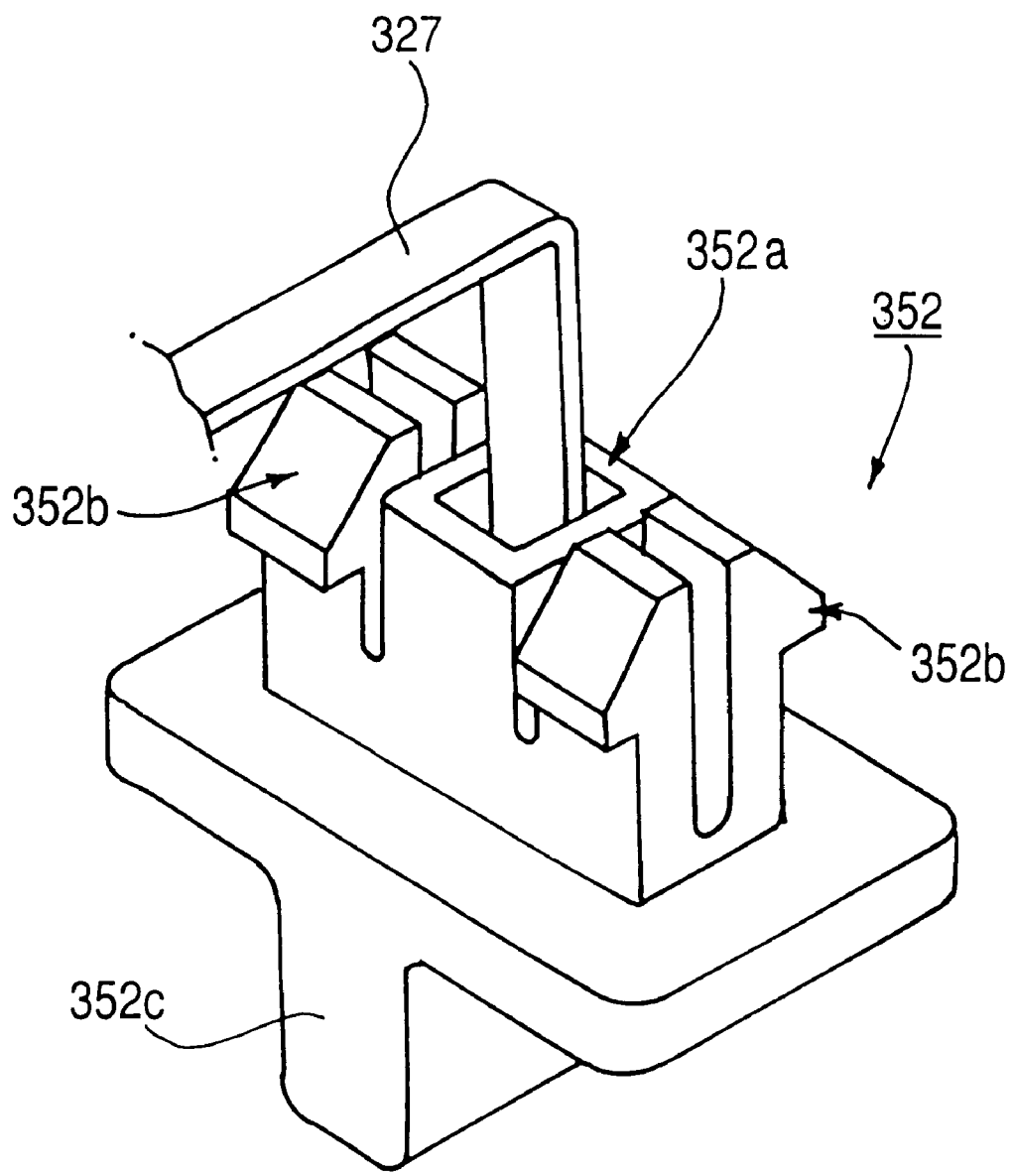
FIG. 16 is an enlarged perspective view illustrating a switch knob shown in FIG. 15.
Figure 17A:
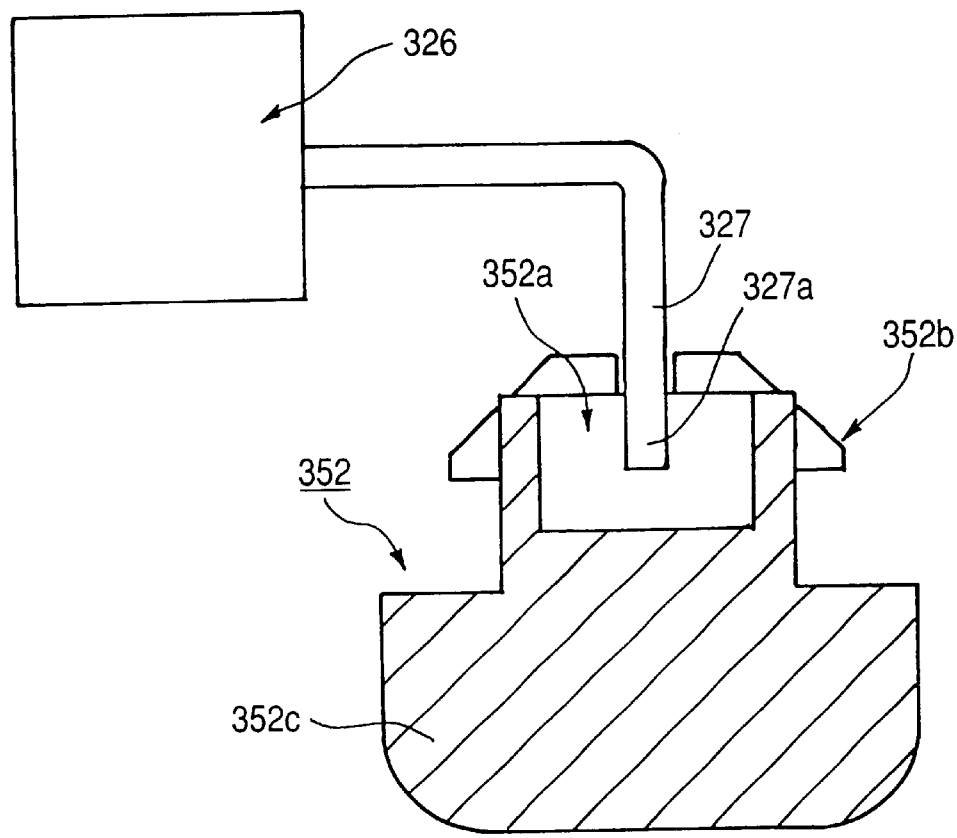
FIGS. 17A and 17B are an enlarged sectional view and a plan view, each of which illustrates primary parts of the switch knob and a switch lever that are shown in FIG. 16 and in an engaged state.
Figure 17B:
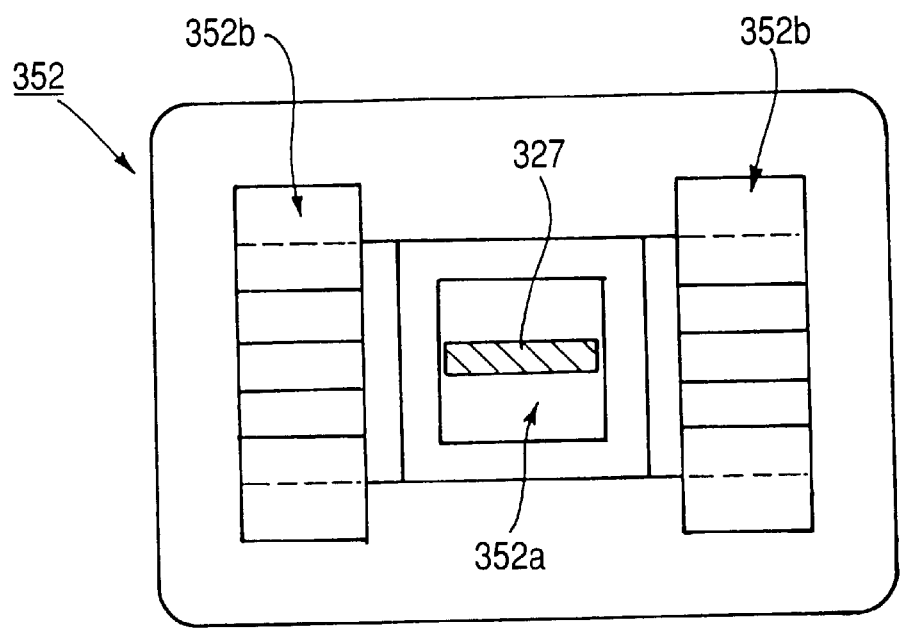

FIG. 15 is an exploded perspective view illustrating a room lamp to which a lamp unit mounting structure according to a seventh embodiment of the invention is applied. FIG. 16 is an enlarged perspective view illustrating a switch knob shown in FIG. 15. FIGS. 17A and 17B are an enlarged sectional view and a plan view, each of which illustrates primary parts of the switch knob and a switch lever shown in FIG. 16 and in an engaged state.

The room lamp 320 in the seventh embodiment shown in FIG. 15 is a lamp unit that is mounted in the lamp mounting window 335 opened in the roof trim 333 serving as the interior wall member covering the body roof 302, which serves as the vehicle body panel.

As illustrated in FIG. 15, the room lamp 320 comprises a functional portion A and a design portion B. The functional portion A includes a bulb (that is, an electric bulb) 324 mounted correspondingly to an opening 321a provided in a housing 321, a switch unit 326, and a bus bar circuit 328 for connecting a spring terminal 322 and a tab terminal 323 to the switch unit 326. The functional portion A is mounted onto a vehicle body panel side portion of the roof trim 333. The design portion B includes a cover lens 351, and is mounted onto a vehicle interior side portion of the roof trim 333.

The bulb 324 and the switch unit 326 mounted in the housing 321 of the functional portion A of the lamp are connected to an FFC (flexible flat cable) 340 which is an electric cable of a roof harness, through the pressure-contact terminals 325 of the bus bar circuit 328.

In the switch unit 326, a switch circuit (not shown) connected to the spring terminal 322 is accommodated in an insulating housing. An on/off operation of the switch circuit to switch between ON and OFF states of the bulb 324 is performed by a switch lever 327 extended from the insulating housing (see FIGS. 17A and 17B).

That is, the connection portion of the FFC 340, which is a roof harness preliminarily arranged on the vehicle body panel side portion of a roof trim 333, is pressure-fixed and thus electrically connected to the pressure-contact terminals 325 provided on the housing 321. At that time, a worker can visually check the connection state thereof and fix the connection portion to the pressure-contact terminal by working in a downward posture. Incidentally, although the connection portions of the FFC 340 are weld-fixed to the pressure-contact terminals 325 in this embodiment, other fixing method, such as welding method, may be employed.

Further, a pair of panel mounting portions 331, 331 engageable with the latching opening 302b provided in the body roof 302 is protruded from the top surface of the housing 321. A pair of trim mounting portions 332 are provided on the opposite side surfaces of the housing 321.

Each of the panel mounting portions 331, 331 is an anchor-like clip having a pair of elastic latching pieces, and cannot be pulled out after inserted into the corresponding latching opening 302b. Each of the latching openings 302b is a rectangular elongated hole extending in a sliding direction (that is, the direction of an arrow X shown in the figure), in which the switch knob 352 slides. This enables the housing 321, which is mounted onto the body roof 302, to perform relative displacement along this sliding direction (that is, the direction of the arrow X shown in the figure).

Each of the trim mounting portions 332 is a flexible engaging piece adapted to be elastically engaged with the opening edge of the lamp mounting window 335, which is opposed thereto, when the housing 321 is mounted onto the rectangular lamp mounting window 335. The housing 321 is adapted to perform relative displacement by being elastically pushed along the sliding direction (that is, the direction of the arrow X shown in the figure) in which the switch knob 352 (to be described later) slides, and along a direction (that is, the direction of an arrow Y shown in the figure) perpendicular to the sliding direction with respect to the lamp mounting window 335.

The cover lens 351 constituting the design portion B is mounted onto the roof trim 333 by engaging the latching projections 351a with the engaging holes 333a of the roof trim 333 in such a way as to cover the lamp mounting window 335 of the roof trim 333, as illustrated in FIG. 15.

The switch knob 352 is preliminarily slidably fitted into the sliding groove 353 provided in the cover lens 351. When the cover lens 351 is assembled to the roof trim 333, the end portion 337a of the switch lever 327 is engaged with the engaging portion 352a of the switch knob 352, as illustrated in FIGS. 16, 17A and 17B. Therefore, the switch lever 327 is operated from the vehicle interior side by using the switch knob 352.

As shown in FIGS. 16, 17A and 17B, the switch knob 352 includes an engaging portion 352a with which the end portion 337a of the switch lever 327 is engaged, a pair of elastic latching portions 352b, 352b press-fitted into the sliding groove 353 so that the switch knob 352 is preliminarily slidably mounted onto the cover lens 351, and an operating portion 352c having predetermined color and shape and exposed to the indoor side.

As shown in FIGS. 17A and 17B, the engaging portion 352a is a rectangular-prism-like concave portion, to which the end portion 337a of the switch lever 327 is inserted. The plate-like end portion 337a is enabled to perform relative displacement in a direction (that is, the direction of the arrow Y shown in the figure) perpendicular to the sliding direction in which the switch knob 352 slides, with respect to the engaging portion 352a. However, it is nearly impossible for the plate-like end portion 337a to perform relative displacement in the sliding direction (that is, the direction of the arrow X shown in the figure) in which the switch knob 352 slides.

Thus, the switch knob 352 can be engaged with the switch lever 327 in the sliding direction (that is, the direction of the arrow X shown in the figure) without play.

Further, when a roof module is formed by preliminarily mounting the room lamp according to the seventh embodiment onto the roof trim 333, first, the housing 321 connected to the connection portion of the FFC 340 is mounted in the lamp mounting window 335 that is opened in the roof trim 333.

At this time, the trim mounting portions 332 of the hosing 321 are engaged with the opposite opening edges (or sides) of the lamp mounting window 335. Thus, the functional portion A of the lamp is directly mounted onto and latched by the roof trim 333 without backlash.

That is, the housing 321 can perform relative displacement with respect to the roof trim 333 in the lamp mounting window 335 against the elastic pushing forces of the trim mounting portions 332.

On the other hand, the cover lens 351 of the design portion B of the room lamp 320 is mounted on the roof trim 333 from the vehicle interior side thereof in such a way as to cap the lamp mounting portion A mounted in the lamp mounting window 335. That is, the engaging projections 351a provided on the circumferential wall in such a manner as to project therefrom are engaged with the engaging holes 333a. Consequently, the cover lens 351 mounted on the roof trim 333 in such a way as to cover the lamp mounting window 335 thereof.

At this time, the cover lens 351 is mounted on the lamp mounting window 335 by adjusting the position of the switch knob 352 so as to reliably insert the end portion 337a of the switch lever 327 into the engaging portion 352a.

Subsequently, the FFC 340 is arranged on a vehicle body panel side portion (that is, a top-side portion, as viewed in FIG. 15) of the roof trim 333. A roof module is constructed by preliminarily mounting components (not shown) to be mounted on the roof, such as a rearview mirror and a sun visor, onto the roof trim 333.

Thus, the assembling operation is completed by only mounting the roof module on the body roof 302. Consequently, when the roof trim is mounted, an operation of mounting the roof-mounted components on the roof trim 333 can be omitted. Thus, the assembling operation is simplified.

Furthermore, according to the lamp unit mounting structure of the seventh embodiment, when the roof trim 333 with which the room lamp 320 is integral is assembled to the body roof 302, the housing 321 of the room lamp 320 is simultaneously mounted in the opening 302a of the body roof 302.

At that time, the housing 321 caught in the latching opening 302b through the panel mounting portions 331 can perform relative displacement along the sliding direction (that is, the direction of the arrow X shown in the figure) in which the switch knob 352 slides.

Thus, when the positional displacement between the roof trim 333 assembled to the body roof 302 and the body roof 302 is caused along the sliding direction (that is, the direction of the arrow X shown in the figure), the housing 321 can perform relative displacement with respect to the body roof 302 and the roof trim 333 along the sliding direction (that is, the direction of the arrow X shown in the figure). Consequently, the roof trim 333 is mounted onto the body roof 302 by simultaneously absorbing the positional displacement caused along the sliding direction.

On the other hand, when the positional displacement of the roof trim 333 assembled to the body roof 302 and the body roof 302 is caused along a direction (that is, the direction of the arrow Y shown in the figure) perpendicular to the sliding direction, the housing 321 performs relative displacement with respect to the roof trim 333. Therefore, the housing 321 is mounted onto the body roof 302 by simultaneously absorbing the positional displacement caused along the direction (that is, the direction of the arrow Y shown in the figure) perpendicular to the sliding direction.

This prevents an occurrence of an assembling failure, which would disable the mounting of the room lamp 320 onto the body roof 302 owing to the positional displacement caused when the roof trim 333 is assembled to the body roof 302. Consequently, the housing 321 can easily be assembled to the body roof 302 by simultaneously performing aligning.

The cover lens 351 is fixed to the lamp mounting window 335 of the roof trim 333 from the vehicle interior side independently of the housing 321. The cover lens 351 is mounted onto a predetermined place, regardless of the positional displacement of the roof trim 333. Therefore, the appearance of the lamp unit is not deteriorated by the condition in which the roof trim 333 is mounted onto the body roof 302, so that the quality of the lamp unit is enhanced.

When the housing 321 absorbs the positional displacement caused along the sliding direction (that is, the direction of the arrow Y shown in the figure) in which the switch knob 352 slides, the housing 321 performs positional displacement with respect to the roof trim 333. In this time, the end portion 337a of the switch lever 327 engages with the engaging portion 352a of the switch lever 327 in such a way as to be able to perform relative displacement in the direction (that is, the direction of the arrow Y shown in the figure) perpendicular to the sliding direction in which the switch knob 352 slides. Therefore, there is no hindrance to the engagement between the switch lever 327 and the switch knob 352.

On the other hand, the housing 321 performs relative displacement together with the switch knob 352 of the cover lens 351 fixed to the roof trim 333 when absorbing the positional displacement caused along the sliding direction (that is, the direction of the arrow X shown in the figure) in which the switch knob 352 slides. Therefore, there is no necessity for engaging the end portion 337a of the switch lever 327 with the engaging portion 352 of the switch knob 352 in a loosely fitted state in such a manner as to be able to perform relative displacement with respect to the engaging portion 352.

Thus, a gap in the sliding direction between the end portion 337a of the switch lever 327 and the engaging portion 352a of the switch knob 352 can be minimized. The operating range of each of the switch lever 327 and the switch knob 352 does not change according to the mounting state of the roof trim 333 mounted onto the body roof 302.

Therefore, the assembling operation is completed by only mounting the roof module onto the body roof 302. The operation of mounting the roof-mounted components is omitted when the roof trim is mounted. Consequently, the assembling operation is simplified.

The electrical connection between the connection portions of the FFC 340 and the pressure-contact terminals 325 is pressure-connected by a worker who visually checks the connection state thereof by working in a downward posture. Thus, high reliability of the electrical connection therebetween is obtained, regardless of the accuracy of mounting of the roof trim 333 onto the body roof 302.

Furthermore, in the room lamp 320, the housing 321 of the functional portion A is separated from the cover lens 351 of the design portion B. Thus, even when the housing 321 fixed to the connection portion of the FFC 340 is transported together with the FFC 340, and when the housing 321 is mounted on the roof trim 333, the cover lens 351 is neither brought into contact with other members nor damaged.

That is, only the housing 321 of the room lamp 320 is a member that is preliminarily fixed to the connection portion of the FFC 340 and that is easy to come in contact with another member when moved around together with the FFC 340. Moreover, there is no need for moving the cover lens 351, which is in possibility of being damaged so that the appearance of the lamp unit is deteriorated, together with the FFC 340.

Furthermore, even in the case that the cover lens 351 and the switch knob 352 of the room lamp 320 differ from those of another lamp unit according to the types of vehicles and to the interior, the housing 321 can be used in common by the lamp units. Thus, it is sufficient to change only the cover lens 351 and the switch knob 352 so as to manufacture the lamp units. Consequently, the manufacturing cost of the room lamp 320 decreases.

Incidentally, needless to say, the constituent elements, such as the vehicle body panel, the interior wall member, the functional portion, the switch lever, the switch knob, and the design portion, are not limited to those of the aforementioned seventh embodiment. Various modifications may be made according to the gist of the invention.

Figure 18:
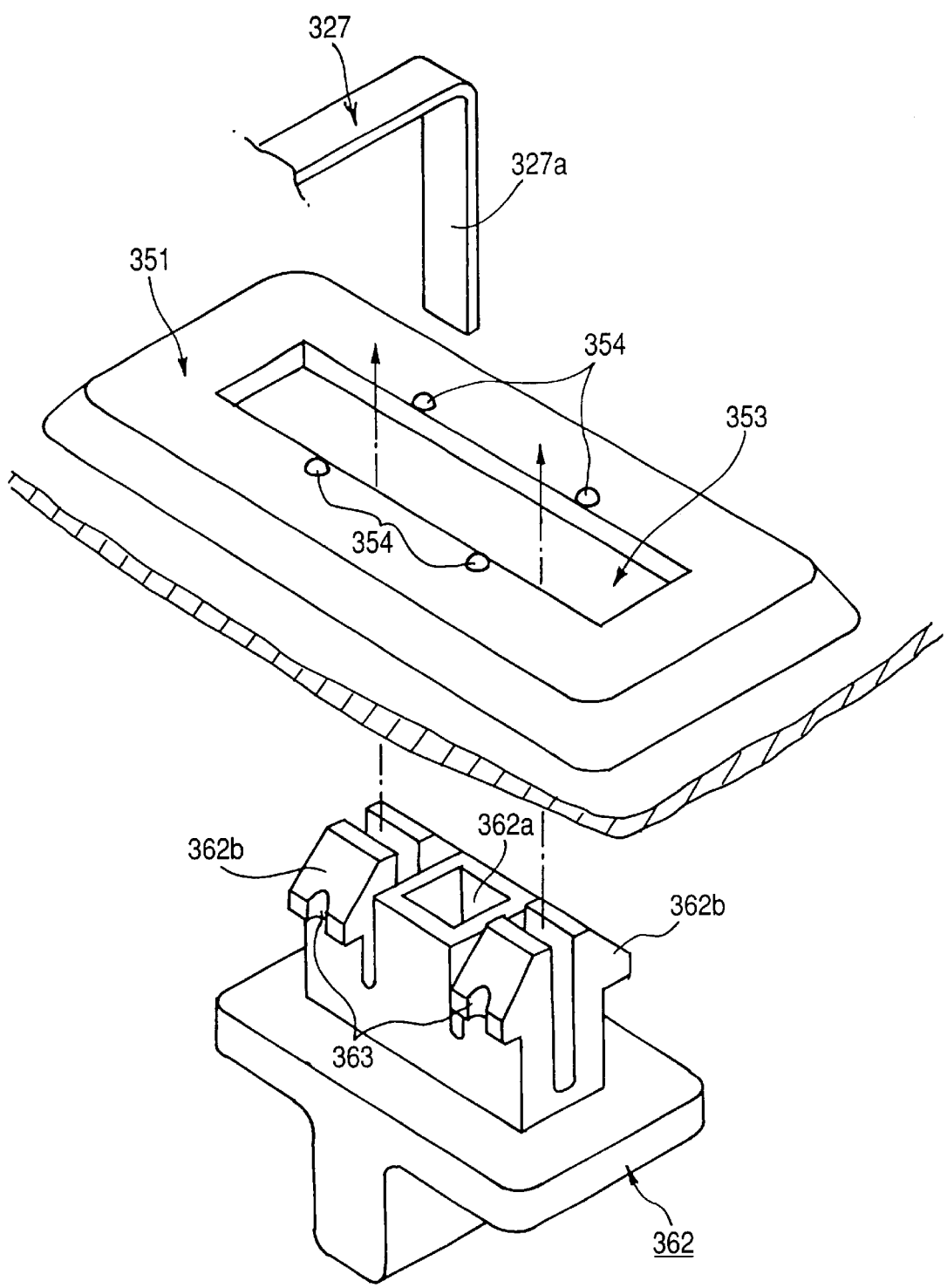
FIG. 18 is an enlarged perspective view illustrating a modification of the switch knob shown in FIG. 16.

For example, as illustrated in FIG. 18, an engaging projection 354 serving as a temporarily latching member for engaging with the engaging concave portion 363 of the switch knob 362 to thereby temporarily latching the switch knob 362 at a predetermined place in such a way as to be unable to slide may be provided in the vicinity of the sliding groove 353 of the cover lens 351.

In this case, the engaging concave portion 363 formed in each of the elastically latching portions 362b engages with the corresponding engaging projection 354 provided in the vicinity of the sliding groove 354 in such a way as to protrude therefrom. Thus, the switch knob 362, which is preliminarily and slidably fitted into the sliding groove 353, is temporarily caught at a predetermined place in such a way as to be unable to slide.

Then, the cover lens 351 is fixed to the lamp mounting window 335 in this state from the vehicle interior side in such a manner as to cover the window 335. Thus, the end portion 337a of the switch lever 327 reliably is engaged with the engaging portion 362a of the switch knob 362 slidably latched by the cover lens 351. Therefore, it is unnecessary for an assembling worker to fix the cover lens 351 to the roof trim 333 by simultaneously performing alignment.

Therefore, the assembling of the cover lens 351 is facilitated. Moreover, the establishment of reliable engagement of the end portion 337a of the switch lever 327 with the engaging portion 362a of the switch knob 362 is facilitated. Consequently, an occurrence of an assembling failure is prevented. Thus, the quality of the lamp unit is enhanced.

Eighth Embodiment

Figure 19:
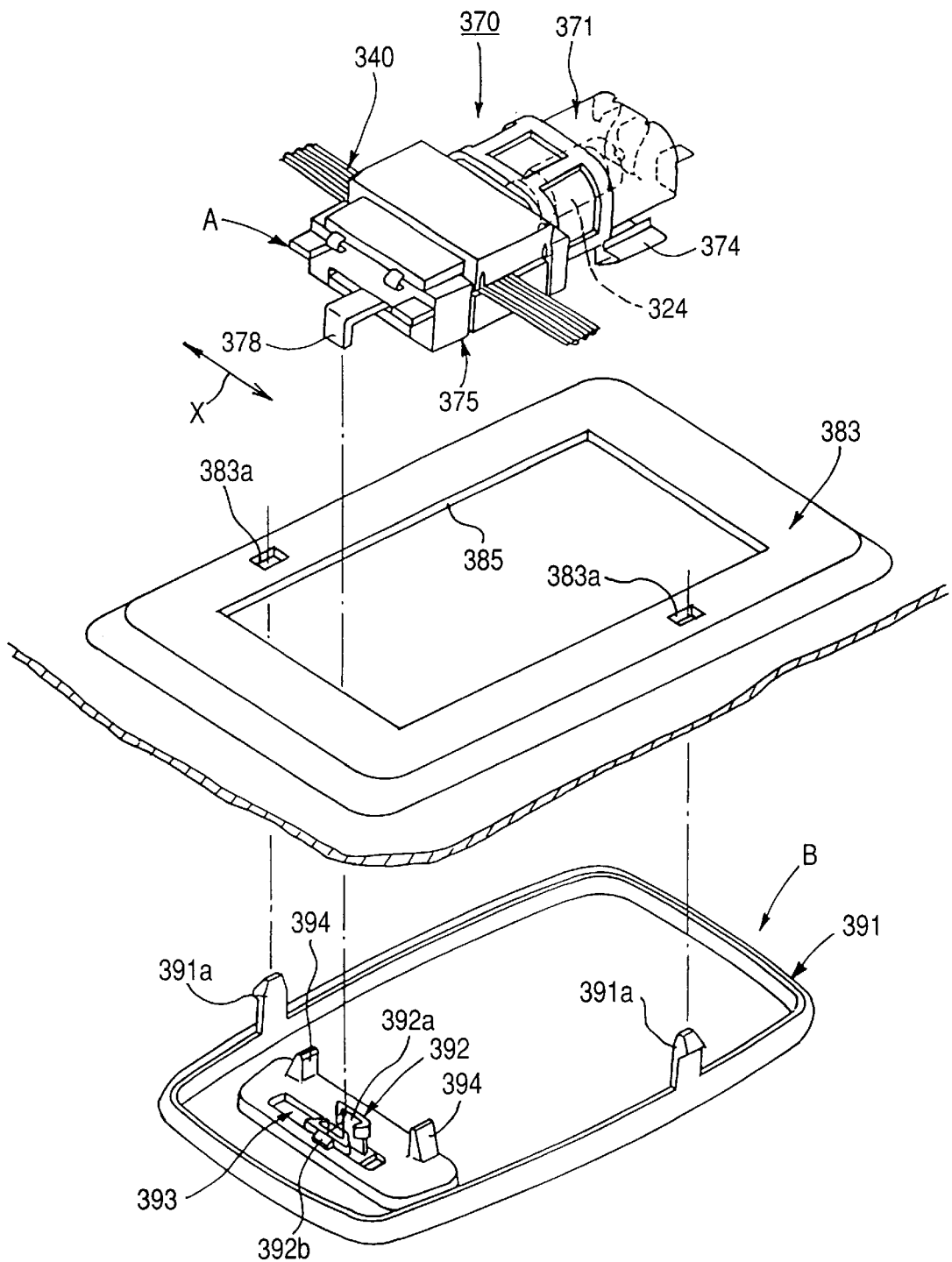
FIG. 19 is an exploded perspective view illustrating a room lamp to which a lamp unit mounting structure according to an eighth embodiment of the invention is applied.
Figure 20:
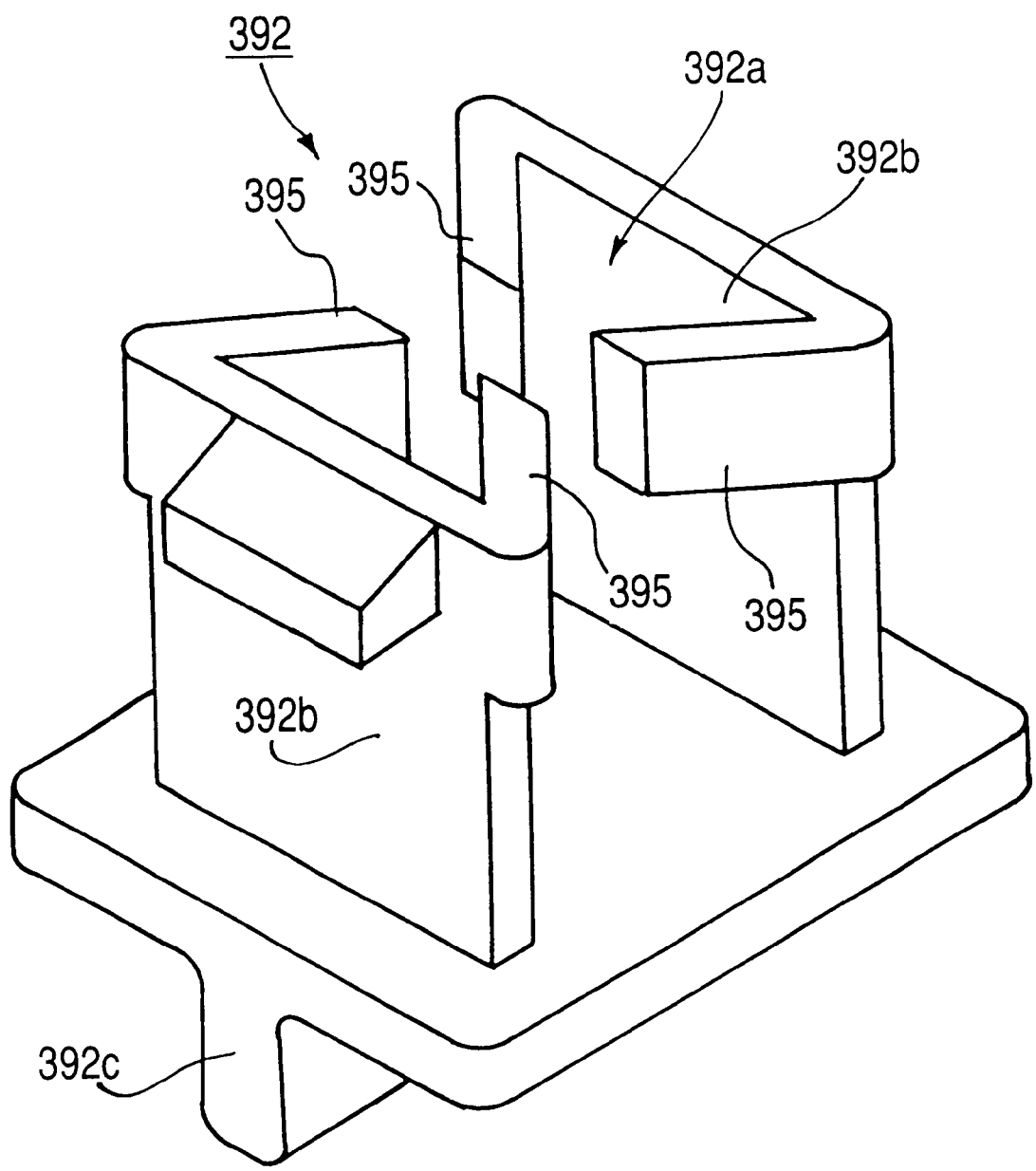
FIG. 20 is an enlarged perspective view illustrating a switch knob shown in FIG. 19.
Figure 21A:
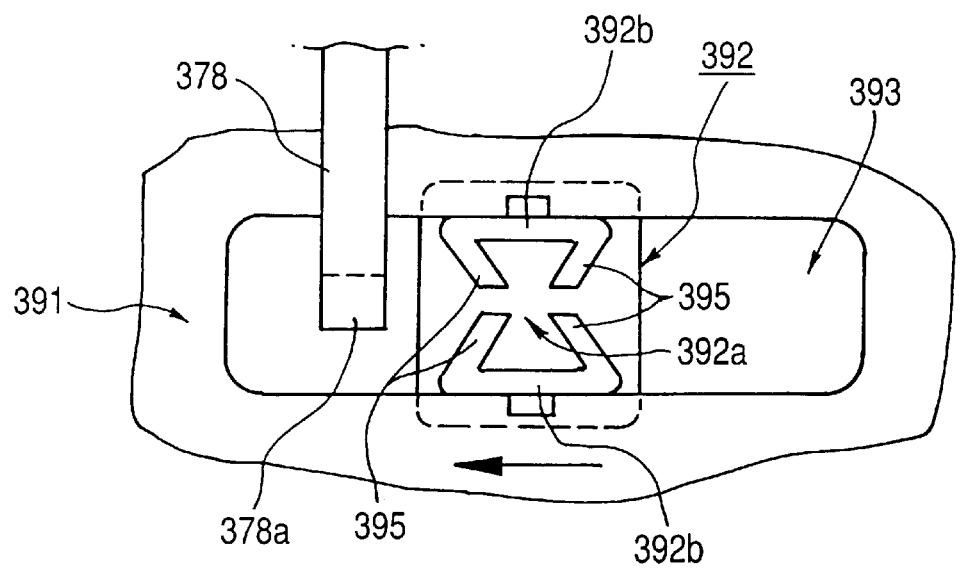
FIGS. 21A and 21B are enlarged plan views each illustrating primary parts of the switch knob and a switch lever that are shown in FIG. 19 and in an engaged state.
Figure 21B:
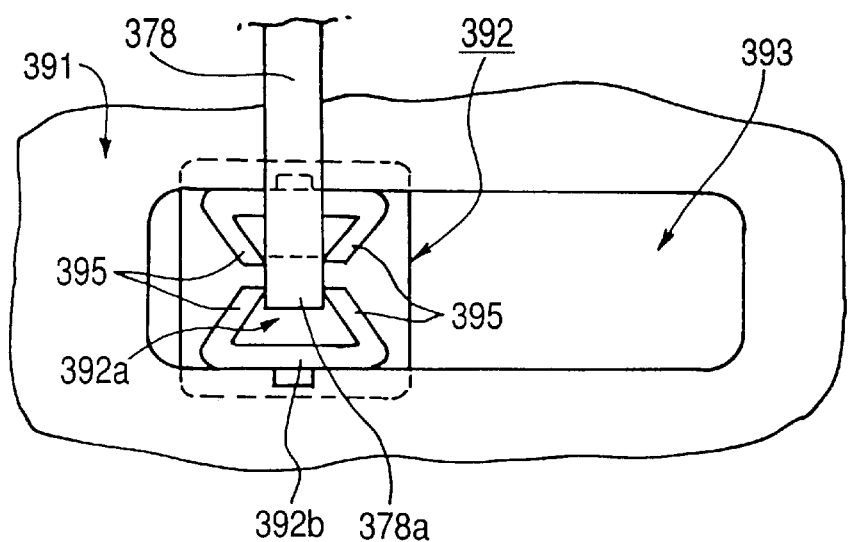
Figure 22A:
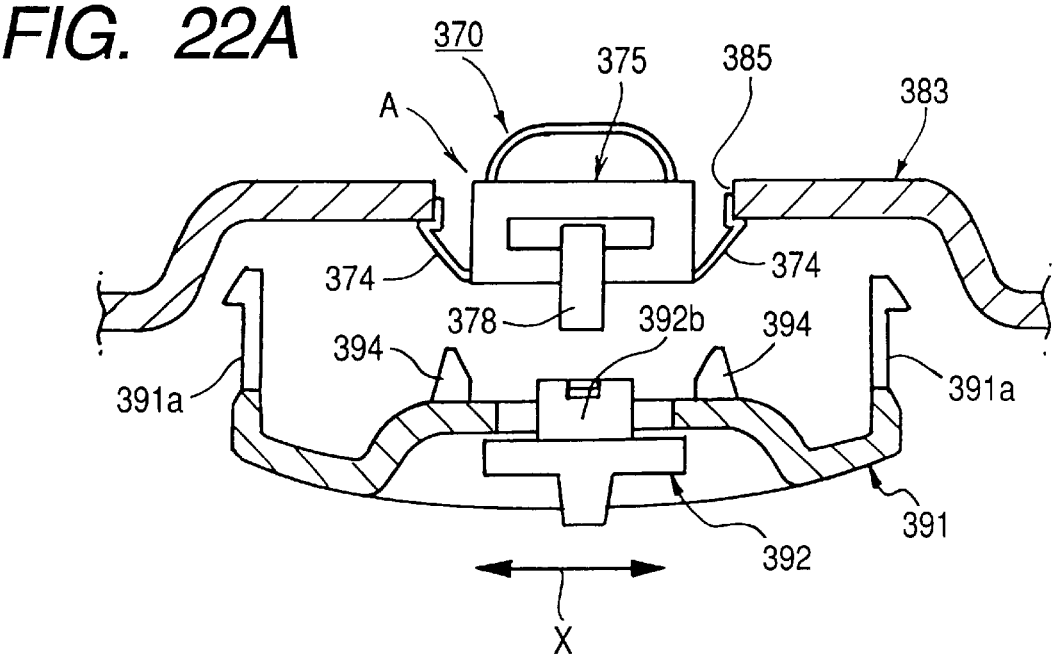
FIGS. 22A and 22B are transversal sectional views illustrating a procedure for mounting the room lamp shown in FIG. 19.
Figure 22B:
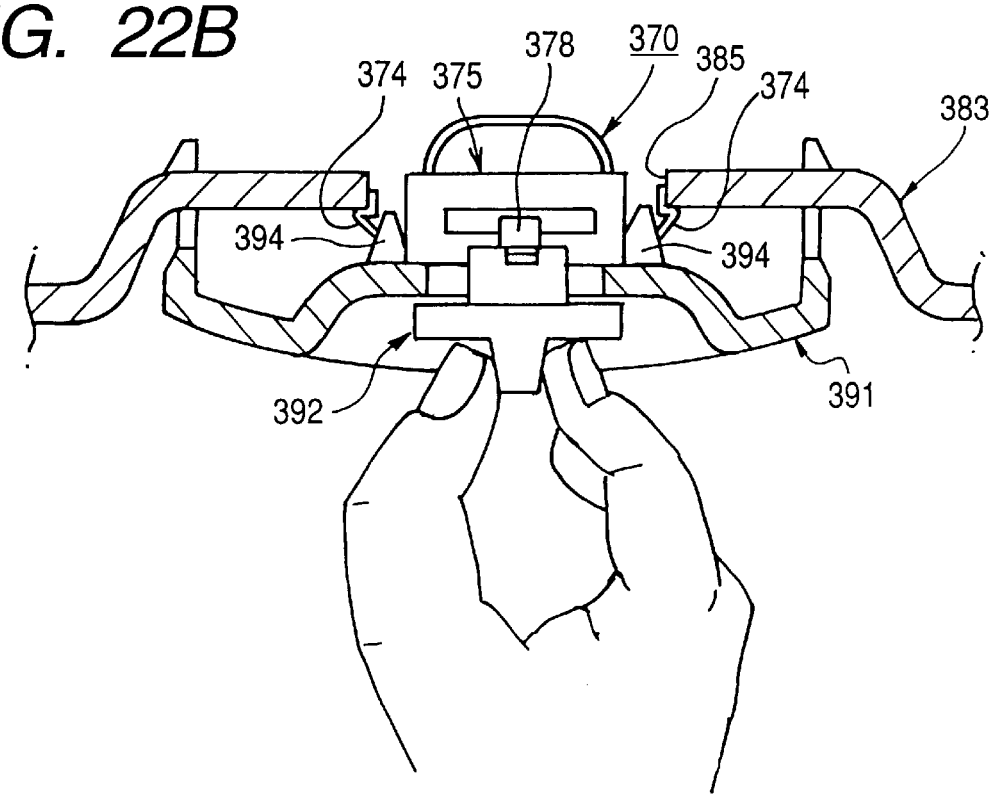
Figure 23:
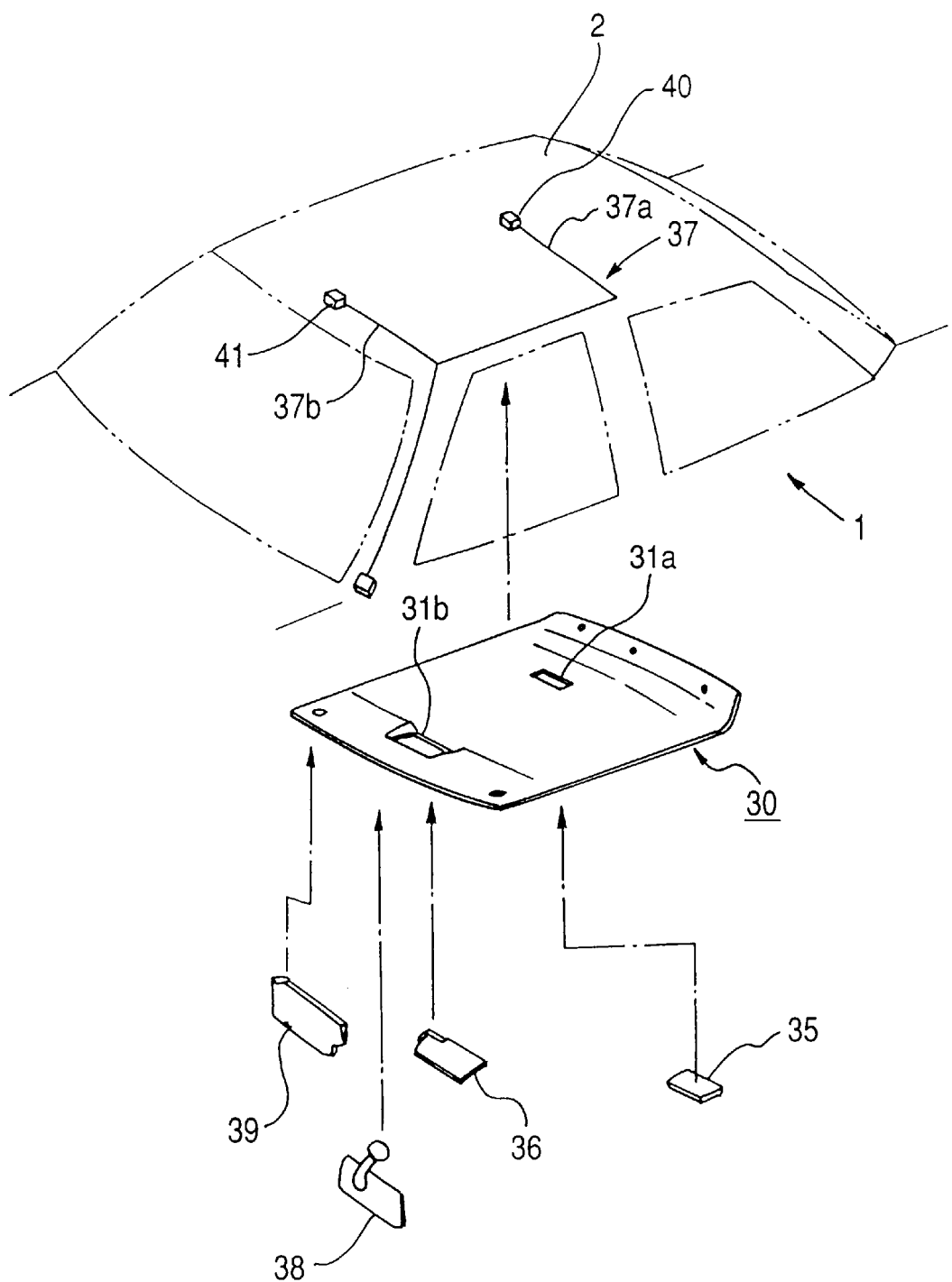
FIG. 23 is a perspective view illustrating a related automobile roof assembling method.

FIG. 19 is an exploded perspective view illustrating a room lamp to which a lamp unit mounting structure according to an eighth embodiment of the invention is applied. FIG. 20 is an enlarged perspective view illustrating a switch knob shown in FIG. 19. FIGS. 21A and 21B are enlarged plan views each illustrating primary parts of the switch knob and a switch lever that are shown in FIG. 19 and in an engaged state. FIGS. 22A and 22B are transversal sectional views illustrating a procedure for mounting the room lamp shown in FIG. 19.

As illustrated in FIG. 19, the room lamp 370 comprises a functional portion A and a design portion B. The functional portion A includes a reflector 371 in which one of bulb contacts is provided, a switch unit 375 in which the other of the bulb contacts is provided, and a bulb 324 mounted between the bulb contacts. The functional portion A is mounted onto a vehicle body panel side portion of the roof trim 383. The design portion B, which is a cover lens 391, is mounted onto a vehicle interior side portion of the roof trim 383.

The reflector 371 is integrally formed by performing press-forming on an electrically conductive metallic plate, such as stainless steel. The reflector 371 has the function of realizing the optimum luminous intensity distribution of the bulb 324 and also has the function serving as a structural support for the functional portion A.

A pair of trim mounting portions 374, 374 engageable with the lamp mounting window 385 are bent-formed on the bottom edges of the opposite side walls of the reflector 371.

The switch unit 375 has a switch circuit (not shown) connected to the other of the bulb contacts and accommodated in an insulating housing. The FFC 340 is pressure-connected to the cable connecting portion of this switch circuit.

Moreover, the switch unit 375 is provided with a switch lever 378 for controlling a switch circuit to switch between ON and OFF states of the bulb 324.

Furthermore, the functional portion A of the lamp is fabricated by integrally assembling the switch unit 375 and the reflector 371 thereto and simultaneously pressure-connecting the FFC 340 thereto and inserting the bulb 324 into between both the opposed bulbs.

As shown in FIG. 19, the cover lens 391 is mounted in the lamp mounting window 385 of the roof trim 383 by engaging the latching projection 391a with the latching hole 383a of the roof trim 383 in such a way as to cover the window 385.

The switch knob 392 is preliminarily and slidably fitted into the sliding groove 393 provided in the cover lens 391.

A pair of regulating projections 394, 394 serving as position regulating member for regulating the relative displacement of the cover lens 391 with respect to the functional portion A along the sliding direction (that is, the direction of the arrow X shown in the figure), in which the switch knob 392 slides, is protruded from the inner surface of the cover lens 391, which is placed in the vicinity of the sliding groove 393.

As shown in FIGS. 20, 21A and 21B, the switch knob 392 includes an engaging portion 392a with which the end portion 378a of the switch lever 378 is engaged, a pair of elastic latching walls 392b, 392b which are press-fitted into the sliding groove 393 so that the switch knob 392 is preliminarily slidably mounted onto the cover lens 391, and an operating portion 392c having predetermined color and shape and exposed to the vehicle interior side.

The engaging portion 392a is defined by a pair of flexible arms inwardly and obliquely extended from the top portions of opposite side edges of each of the elastic engaging walls 392b. The engaging portion 392a constitutes a latching member for enabling the end portion 378a of the switch lever 378 to be inserted thereinto along the sliding direction (that is, the direction of the arrow X shown in the figures).

Thus, the end portion 378a of the switch lever 378 is enabled to go into the engaging portion 392a along the sliding direction (that is, the direction of the arrow X shown in the figure) by simultaneously causing the opposed flexible arms 395, 395 to elastically and inwardly deform.

Incidentally, as illustrated in FIG. 21B, the end portion 378a of the switch lever 378, which has gone into the engaging portion 392a, is caught by the opposed flexible arms 395, 395, and thus cannot come out therefrom along the sliding direction (that is, the direction of the arrow X shown in the figure)

When a roof module is formed by preliminarily mounting the room lamp 370 in the eighth embodiment onto the roof trim 383, first, the functional portion A comprising the switch unit 375 and the reflector 371 connected to the connection portion of the FFC 340 is mounted onto the lamp mounting window 385, which is opened in the roof trim 383.

At this time, each of the trim mounting portions 374 of the reflector 371 is elastically engaged with the opening edge (that is, a long side) of the opposed lamp mounting window 385. Thus, the functional portion A is directly mounted onto the roof trim 383 without backlash. This facilitates the assembling of the functional portion A. Thus, the functional portion A can perform relative displacement with respect to the roof trim 383 in the lamp mounting window 385 against the elastic pushing force of each of the trim mounting portions 374.

On the other hand, as illustrated in FIGS. 22A and 22B, the cover lens 391 of the design portion B of the room lamp 370 is mounted onto the roof trim 383 in such a way as to cap the functional portion A attached to the lamp mounting window 385 from the vehicle interior side thereof. That is, the cover lens 391 is mounted onto the roof trim 383 by engaging the latching projections 391a, which is protruded from the circumferential wall, with the latching hole 383a, in such a manner as to cover the lamp mounting window 385 of the roof trim 383.

At this time, in the case of only mounting the cover lens 391 onto the lamp mounting window 385, the end portion 378a of the switch lever 378 may not engage with the engaging portion 392a of the switch knob 392. However, the end portion 378a can go into the engaging portion 392a by only performing, after the cover lens 391 is mounted thereonto, a sliding operation of causing the switch knob 392 to slide, as illustrated in FIG. 21B.

Thus, there is no necessity for mounting the cover lens 391 onto the lamp mounting window 385 by simultaneously adjusting the position of the switch knob 392 so as to reliably insert the end portion 378a of the switch lever 378 into the engaging portion 392a. The latching member of the engaging portion 392a of the switch knob 392 enables the switch lever 378 to be inserted thereinto along the sliding direction by performing only a sliding operation on the switch knob 392 caught by the cover lens 391 after the cover lens 391 is fixed to the roof trim 383 in such a manner as to cover the lamp mounting window 385. Consequently, the switch lever 378 is reliably engaged with the engaging portion 392a of the switch knob 392.

Therefore, it is unnecessary for a worker to fix the cover lens 391 to the roof trim 383 by simultaneously performing alignment. This facilitates the assembling operation. Moreover, the establishment of reliable engagement of the switch lever 378 with the engaging portion 392a of the switch knob 392 is facilitated. Thus, an occurrence of an assembling failure is prevented. Consequently, the quality of the lamp unit is improved.

Furthermore, according to the room lamp 370 in the eighth embodiment, as illustrated in FIG. 22A, the functional portion A to be preliminarily connected to the FFC 340 arranged on a vehicle-body-panel-side portion of the roof trim 383 is elastically supported by the trim mounting portions 374, 374 on the lamp mounting window 385 in such a manner as to be able to perform relative displacement at least along the sliding direction (that is, the direction of the arrow X shown in the figure) with respect to the lamp mounting window 385 of the roof trim 383. Thus, the functional portion A is mounted onto the lamp mounting window 385 without backlash by simultaneously performing alignment. Consequently, the assembling of the functional portion A of the lamp is facilitated.

When the cover lens 391 is fixed onto the lamp mounting window 385 from the vehicle interior side thereof in such a way as to cover the window 385, as illustrated in FIG. 22B, a pair of the regulating projections 394, 394 of the cover lens 391 are engaged with the opposite side surfaces of the housing 375 and restrict the relative displacement along the sliding direction (that is, the direction of the arrow X in the figure), in which the switch knob 392 slides.

Thus, movement of the functional portion A in response to an operation of the switch knob 392 is restricted. Consequently, the assembling of the room lamp is facilitated by elastically supporting the functional portion A on the lamp mounting window 385. The operability of each of the switch knob 392 and the switch lever 378 is enhanced. The quality of the room lamp is improved.

Furthermore, the assembling of the room lamp in the eighth embodiment is performed by following a procedure similar to that for assembling the room lamp 320 in the seventh embodiment when a roof module is formed by preliminarily mounting the room lamp 370 in the eighth embodiment onto the roof trim 383. Moreover, the eighth embodiment obtains advantageous effects similar to those of the seventh embodiment.

Incidentally, needless to say, the constituent elements, such as the vehicle body panel, the interior wall member, the lamp unit, the cable connecting portions and the cables, are not limited to those of each of the aforementioned embodiments. Various modifications may be made according to the gist of the invention.

For example, in the foregoing description of the aforementioned embodiments, it has been described the case that the room lamp serving as the electric component is mounted onto the roof trim serving as the interior wall member. However, the invention can be applied to the cases that the map lamp is mounted onto the roof trim, and that the lamp unit, such as a courtesy lamp, is mounted onto a door trim serving as an interior wall member for covering a vehicle body panel, such as a door panel.

Furthermore, the cable to be arranged on the interior wall member is not limited to the FFC. For instance, flat circuit elements, such as an FPC (flexible printed circuit board) and a ribbon cable, and a cable harness may be used as the cable to be arranged on the interior wall member.

Additionally, needless to say, the cable connecting portions provided in the functional portions of the lamps are not limited to those of the aforementioned embodiments utilizing the pressure-connection and the welding techniques. Various kinds of cable connecting portions may be employed.

According to the invention, the connection portion of the cable to be preliminarily arranged on the interior wall member is fixed to the cable connecting portion of the lamp unit (that is, the functional portion). When the cable is arranged on the interior wall member, the lamp unit (that is, the functional portion) is simultaneously mounted in the lamp mounting window.

Thus, the lamp unit (that is, the functional portion) and the cable are put into a state, in which the lamp unit (the functional portion) and the cable are electrically connected to each other, without using the connectors. Further, the lamp unit (that is, the functional portion) and the cable, which are in such a state, and the interior wall member are integrally formed and modularized. Then, an assembling operation is completed by only assembling a module, which is formed so that the lamp unit (that is, the functional portion) and the cable are integral with the interior wall member, to the vehicle body panel.

Further, the electrical connection between the lamp unit (that is, the functional portion) and the cable is established by a worker who visually checks the connection state thereof and fixes the cable to the lamp unit (that is, the functional portion) by working in a downward posture. Thus, high reliability of the connection therebetween is obtained, regardless of the accuracy of mounting of the interior wall member onto the vehicle body panel.

Further, according to the mounting structure in which the lamp unit is divided into the functional portion and the design portion, even when the functional portion fixed to the connection portion of the cable is transported together with the cable and mounted on the interior wall member, the design portion is prevented from being flawed by being brought into contact with other members.

Moreover, even in the case that the design portions of the lamp units differ from each other according to the types of vehicles, the functional portion may be employed in common by the lamp units. Thus, it is sufficient to change only the design portion so as to manufacture the lamp units. Consequently, the manufacturing cost of the lamp units is reduced.

Furthermore, according to the invention, even when the functional portion fixed to the connection portion of the cable is transported together with the cable and mounted on the interior wall member, the design portion is prevented from being flawed by being brought into contact with other members.

Additionally, even in the case that the design portions of the lamp units differ from each other according to the types of vehicles, the functional portion may be employed in common by the lamp units. Thus, it is sufficient to change only the design portion so as to manufacture the lamp units.

Further, according to the invention, a bulb (that is, an electric bulb) is mounted between one of the bulbs, which is provided in the reflector that is integrally formed from the electrically conductive material and that serves as a circuit conductor, and the other bulb contact of the switch unit. Moreover, the connection portion of each of the cables is directly fixed to the cable connecting portion of a corresponding one of the reflector and the switch unit of the functional portion. This eliminates the necessity for providing conductors, such as a bus bar, and connector portions in the functional portion in such a way as to be separated from one another. Consequently, the number of components is reduced, as compared with that of components of the conventional lamp unit.

According to the invention, when the interior wall member assembled to the vehicle body panel causes positional displacement with respect to the vehicle body panel along the sliding direction in which the switch knob slides, the functional portion can perform relative displacement with respect thereto along the sliding direction together with the interior wall member. Consequently, the functional portion is mounted on the vehicle body panel by absorbing the positional displacement caused along this sliding direction.

On the other hand, when the interior wall member assembled to the vehicle body panel causes positional displacement with respect to the vehicle body panel along a direction perpendicular to the sliding direction in which the switch knob slides, the functional portion can perform relative displacement with respect thereto along the sliding direction together with the interior wall member. Consequently, the functional portion is mounted on the vehicle body panel by absorbing the positional displacement caused along the direction perpendicular to the sliding direction.

Therefore, an assembling failure disabling the mounting of the lamp unit is prevented from occurring owing to the positional displacement caused at the time of assembling the interior wall member to the vehicle body panel. Consequently, the functional portion is easily assembled to the vehicle body panel by simultaneously performing aligning.

Furthermore, the design portion is fixed in the lamp mounting window of the interior wall member from the indoor side independent of the functional portion. Thus, the design portion is mounted at the predetermined place regardless of the positional displacement of the interior wall member with respect to the vehicle body panel. Consequently, the appearance of the lamp unit is not deteriorated by the mounting state of the interior wall member, so that the quality of the lamp unit is enhanced.

According to the invention, the functional portion, which is connected to each of the cables preliminarily arranged on the interior wall member, is elastically supported in such a way as to perform positional displacement at least along the sliding direction, in which the switch knob slides, with respect to the lamp mounting window of the interior wall member. Thus, the functional portion is mounted without backlash by simultaneously performing alignment. Consequently, the assembling of the functional portion is facilitated.

Further, when the design portion is fixed from the indoor side in such a way as to cover the lamp mounting window, the position regulating member of the design portion engages with the functional portion and regulates the relative displacement caused along the sliding direction in which the switch knob slides. When the switch lever of the switch unit of the functional portion is engaged with the engaging portion of the switch knob that is slidably caught by the design portion, the switch lever is enabled by the switch knob to operate.

Thus, the movement of the functional portion, which is caused in response to an operation of the switch knob, is restricted. Therefore, although the functional portion is elastically supported by the lamp mounting window, so that the assembling of the lamp unit is easily performed, the operability of each of the switch knob and the switch lever is enhanced. Further, the quality of the lamp unit is improved.

What is claimed is:

1. A lamp unit mounting structure for mounting a lamp unit in a lamp mounting window formed through an interior wall member covering a vehicle body panel, the lamp unit comprising:
    a design portion; and
    a lamp functional portion, wherein a connection portion of a cable to be arranged on a vehicle body panel side portion of the interior wall member is fixed to a cable connecting portion of the lamp functional portion,
    wherein the lamp functional portion is mountable on the vehicle body panel for movement relative to the vehicle body panel in at least one direction, and
    wherein, when the design portion and the lamp functional portion are mounted on the interior wall member, the design portion covers the lamp functional portion from a direction facing toward an interior side of the interior wall member.

2. The lamp unit mounting structure according to claim 1, wherein, a switch lever provided on the lamp functional portion is engaged with a switch knob provided on the design portion when the design portion is assembled to the functional portion, whereby the switch lever can be operated by the switch knob.

3. The lamp unit mounting structure according to claim 1, further comprising a cable fixing member, provided adjacent to the connection portion, for holding the cable at the lamp functional portion to prevent a pulling force from acting upon the connection portion of the cable.

4. A lamp unit mounting structure for mounting a lamp unit in a lamp mounting window formed through an interior wall member covering a vehicle body panel, the lamp unit comprising:
    a design portion; and
    a lamp functional portion including,
        a reflector which is integrally formed of an electrically conductive material and provided with a first bulb contact, and
        a switch unit which accommodates a switch circuit and is provided with a second bulb contact,
    wherein connection portions of cables to be arranged on a vehicle body panel side portion of the interior wall member are fixed to cable connecting portions of the reflector and the switch unit, respectively, and
    wherein, when the design portion and the lamp functional portion are mounted on the interior wall member, the design portion covers the lamp functional portion from a direction facing toward an interior side of the interior wall member.

5. The lamp unit mounting structure according to claim 4, wherein the cable connecting portion of the reflector is provided adjacent to the cable connecting portion of the switch unit so that the cable connecting portions of the reflector and the switch unit are placed in juxtaposition with each other.

6. The lamp unit mounting structure according to claim 4, wherein the reflector includes a latching member enabled to be engaged with the lamp mounting window.

7. The lamp unit mounting structure according to claim 4, wherein the reflector includes a cable holding portion for guiding and holding the cable arranged along an outer side surface of the reflector.

8. The lamp unit mounting structure according to claim 4, further comprising a cable fixing member, provided in vicinity of the connection portion, for holding the cable at the lamp functional portion to prevent a pulling force from acting upon the connection portion of the cable.

9. A lamp unit mounting structure for mounting a lamp unit in a lamp mounting window formed through an interior wall member covering a vehicle body panel, the lamp unit comprises:
    a lamp functional portion provided with a switch unit including a switch lever; and
    a design portion provided with a switch knob which is slidably fitted thereto and having an engaging portion,
    wherein the lamp functional portion is mounted on the vehicle body panel and the lamp mounting window so that the lamp functional portion is displaceable with respect to the vehicle body panel only in a first direction in which the switch knob is slidable, and displaceable with respect to the lamp mounting window only in a second direction substantially perpendicular to the first direction, and
    wherein the design portion is fixed to the lamp mounting window from a vehicle interior side, and the switch lever is engaged with the engaging portion of the switch knob so that the switch lever is displaceable with respect to the engaging portion of the switch knob only in the second direction and is operated by the switch knob.

10. The lamp unit mounting structure according to claim 9, wherein the design portion includes a temporarily latching member for temporarily latching the switch knob at a predetermined place to prevent the switch knob from sliding.

11. The lamp unit mounting structure according to claim 9, wherein an engaging portion of the switch knob includes a latching member for enabling the switch lever to be inserted in the first direction.

12. A lamp unit mounting structure for mounting a lamp unit in a lamp mounting window formed through an interior wall member covering a vehicle body panel, the lamp unit comprising:

a lamp functional portion provided with a switch unit; and a design portion provided with a switch knob which is slidably fitted thereto, wherein the lamp functional portion is elastically supported by the lamp mounting window so as to be displaceable with respect the lamp mounting window at least in a direction in which the switch knob is slidable, and wherein the design portion includes a position regulating member for restricting relative displacement of the lamp functional portion in the direction.

13. The lamp unit mounting structure according to claim 12, wherein the design portion includes a temporarily latching member for temporarily latching the switch knob at a predetermined place to prevent the switch knob from sliding.

14. The lamp unit mounting structure according to claim 12, wherein an engaging portion of the switch knob includes a latching member for enabling the switch lever to be inserted in the direction in which the switch knob slides.

* * * * *